(12) United States Patent
Johnston

(10) Patent No.: US 10,451,000 B2
(45) Date of Patent: Oct. 22, 2019

(54) NEARLY FULL ADIABATIC ENGINE

(71) Applicant: Barry W. Johnston, Baltimore, MD (US)

(72) Inventor: Barry W. Johnston, Baltimore, MD (US)

( * ) Notice: Subject to any disclaimer, the term of this patent is extended or adjusted under 35 U.S.C. 154(b) by 50 days.

(21) Appl. No.: 15/751,557

(22) PCT Filed: Feb. 19, 2016

(86) PCT No.: PCT/US2016/018624
§ 371 (c)(1),
(2) Date: Feb. 9, 2018

(87) PCT Pub. No.: WO2016/134229
PCT Pub. Date: Aug. 25, 2016

(65) Prior Publication Data
US 2018/0238265 A1    Aug. 23, 2018

Related U.S. Application Data

(60) Provisional application No. 62/118,519, filed on Feb. 20, 2015.

(51) Int. Cl.
*F02G 1/044* (2006.01)
*F02G 1/043* (2006.01)
(Continued)

(52) U.S. Cl.
CPC .............. *F02G 1/044* (2013.01); *F01K 25/10* (2013.01); *F02G 1/043* (2013.01); *F02G 1/0535* (2013.01);
(Continued)

(58) Field of Classification Search
CPC . F01B 1/062; F01B 17/02; F01L 15/12; F01L 21/04
See application file for complete search history.

(56) References Cited

U.S. PATENT DOCUMENTS 3,767,325 A * 10/1973 Schuman .............. F02G 1/0435
                                                          417/207
4,350,012 A     9/1982 Folsom et al.
(Continued)

OTHER PUBLICATIONS

ISR for PCT/US2016/018624 dated May 2, 2016, 1 page.

*Primary Examiner* — Mark A Laurenzi
*Assistant Examiner* — Shafiq Mian
(74) *Attorney, Agent, or Firm* — Hauptman Ham, LLP

(57) ABSTRACT

A near adiabatic engine has four stages in a cycle: (1) a means of adiabatically expanding the working fluid during the downstroke from a high pressure/temperature level to a low level; (2) a means of cooling the working fluid at Bottom Dead Center (BDC); (3) a means of adiabatically compressing that fluid from a low pressure/temperature level at BDC to the higher level at Top Dead Center (TDC); and finally, (4) a means of passing that working fluid back to the high pressure/temperature source in a balanced pressure environment so as to minimize the resistance of that flow. This disclosure teaches the means of achieving (2) and (3) as follows: (2) a means is disclosed of BDC cooling of the expanded working fluid in the working chamber, and (3) a means is disclosed of adiabatically compressing the working fluid into the pump chamber before cycling the fluid.

20 Claims, 12 Drawing Sheets

(51) Int. Cl.
*F01K 25/10* (2006.01)
*F02G 1/053* (2006.01)
*F16J 15/52* (2006.01)

(52) U.S. Cl.
CPC ........... *F16J 15/52* (2013.01); *F02G 2270/40* (2013.01); *F02G 2280/50* (2013.01); *F02G 2290/00* (2013.01)

(56) References Cited

U.S. PATENT DOCUMENTS

| | | | |
|---|---|---|---|
| 4,532,766 A * | 8/1985 | White | F02G 1/0435 277/636 |
| 5,806,403 A | 9/1998 | Johnston | |
| 6,505,538 B1 * | 1/2003 | Johnston | F01B 1/062 91/224 |
| 6,505,539 B2 * | 1/2003 | Schluter | B60T 7/12 91/367 |
| 6,725,670 B2 | 4/2004 | Smith et al. | |
| 7,121,190 B2 * | 10/2006 | Ogawa | F04B 27/0895 92/12.2 |
| 7,581,393 B2 * | 9/2009 | Yaguchi | F01N 5/02 60/521 |
| 8,156,739 B2 * | 4/2012 | Johnston | F01K 3/12 60/522 |
| 2003/0192324 A1 * | 10/2003 | Smith | F02G 1/0435 62/6 |
| 2011/0041506 A1 * | 2/2011 | Johnston | F01K 3/12 60/670 |
| 2011/0271676 A1 | 11/2011 | Walpita et al. | |

* cited by examiner

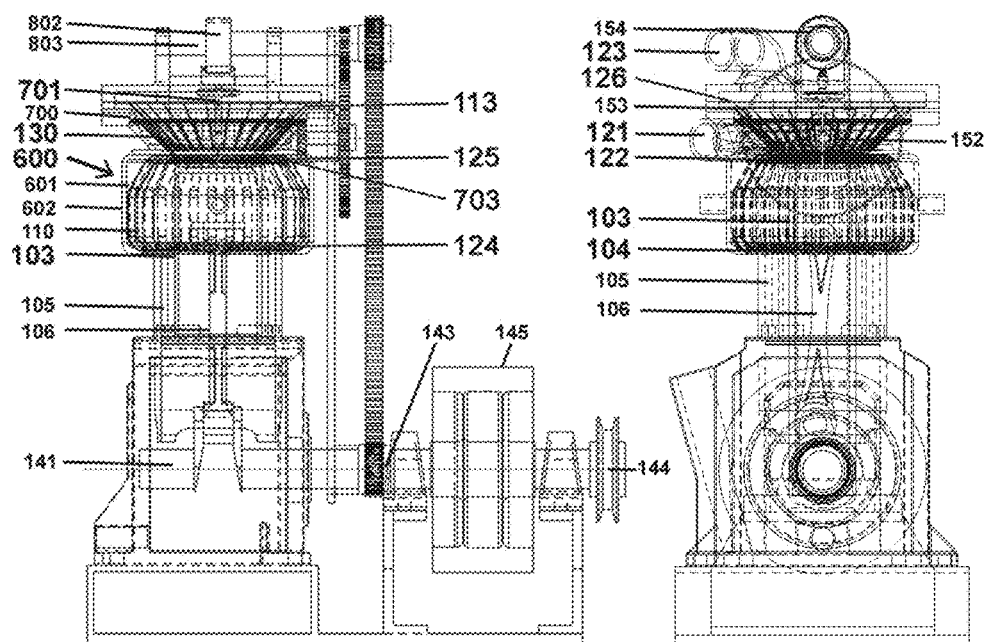
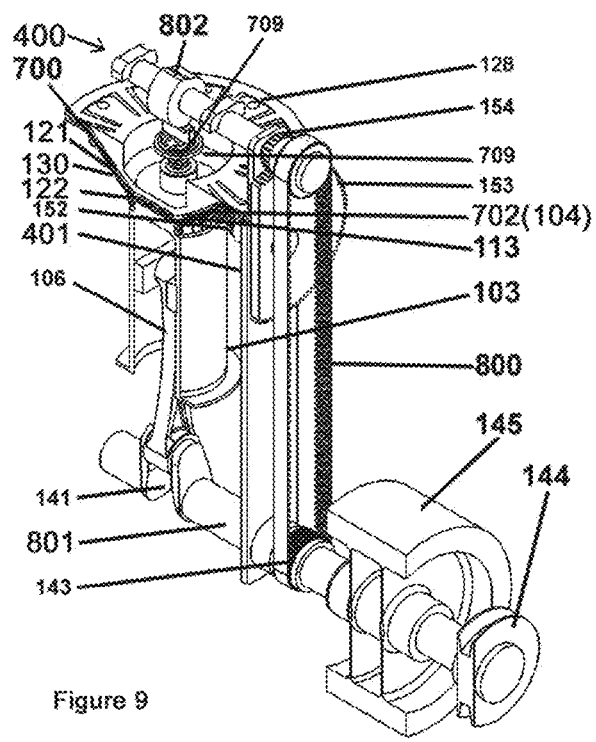
Figure 8
Figure 9

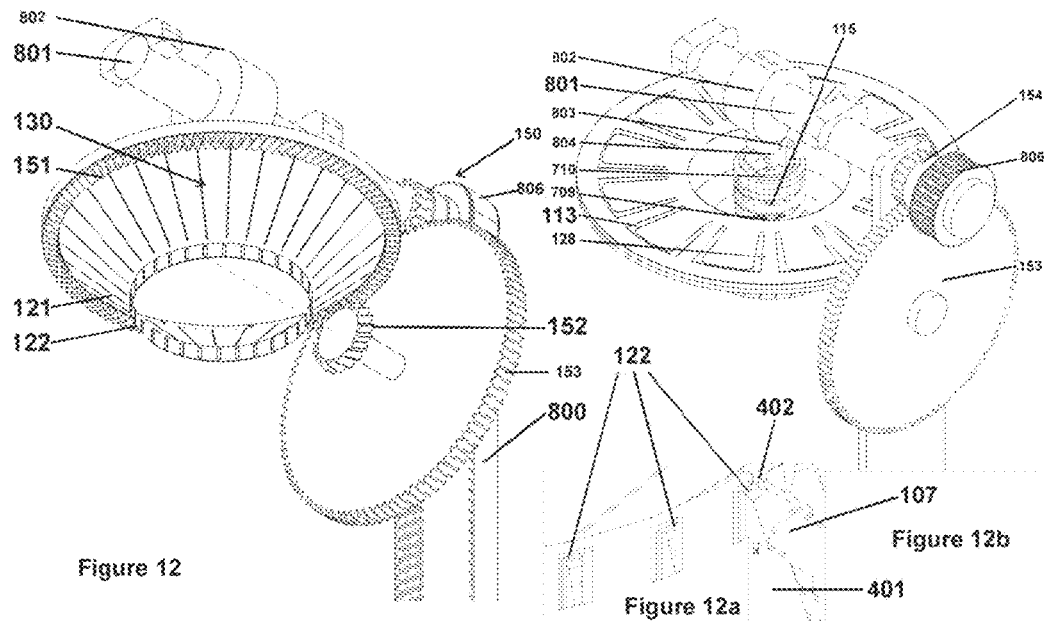
Figure 12
Figure 12a
Figure 12b
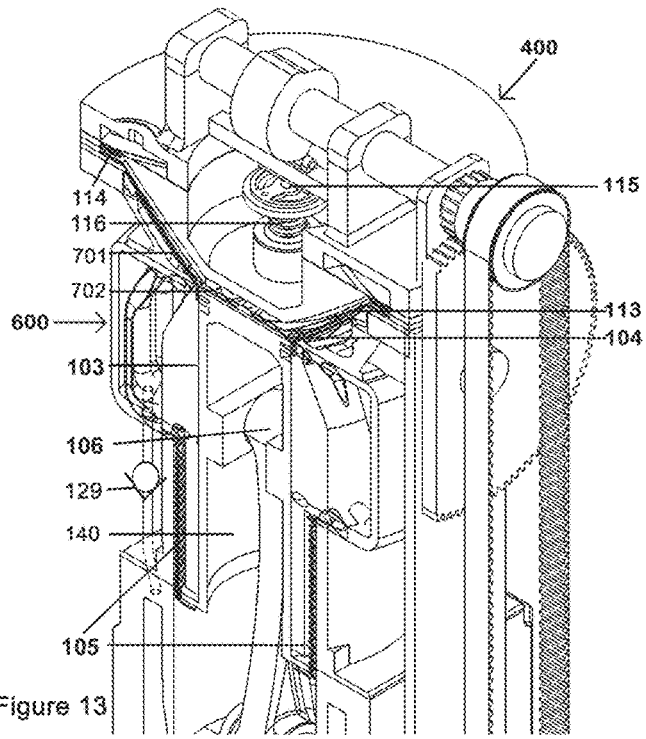
Figure 13

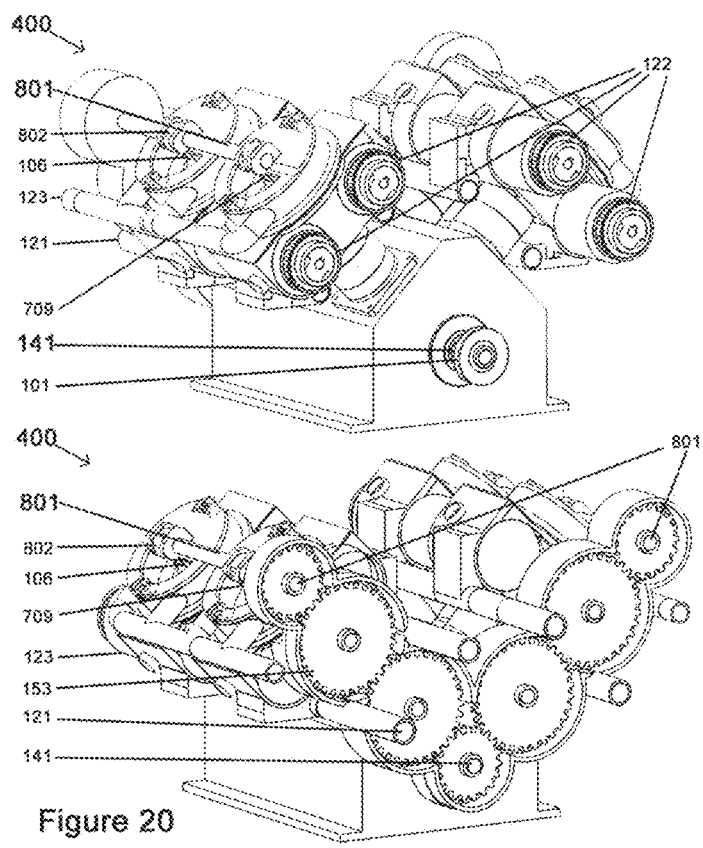
Figure 20
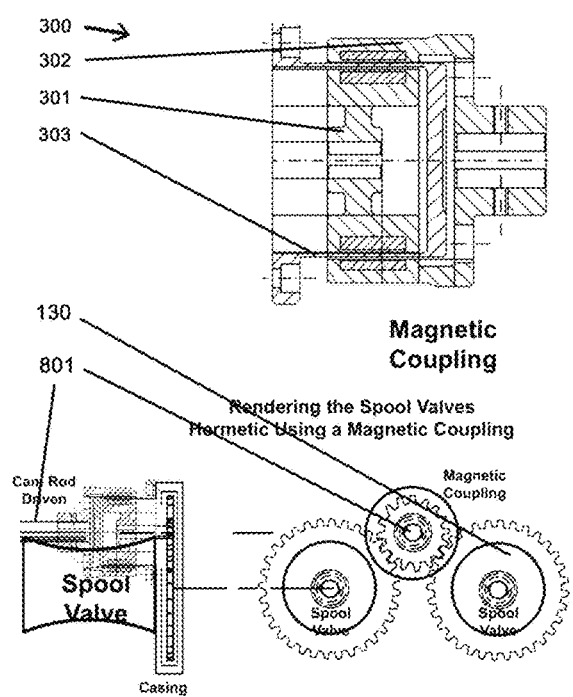
Magnetic Coupling
Figure 21   Spool Valve Mechanism

NEARLY FULL ADIABATIC ENGINE

CROSS-REFERENCE

The present application for patent is National Phase of International Application No. PCT/US16/18624 filed Feb. 19, 2016 and is a continuation in part of International Application No. PCT/US2009/031863 filed Jan. 23, 2009 which designates the United States and claims priority to U.S. Provisional Application No. 61/022,838 filed Jan. 23, 2008 and U.S. Provisional Application No. 61/090,033 filed Aug. 19, 2008, and Provisional Application No. 61/366,389 filed Jul. 21, 2010 and U.S. Pat. No. 8,156,739 issued Apr. 17, 2012. The present application further claims the benefit of and recent U.S. Provisional Patent Application No. 62/118,519 filed Feb. 20, 2015. The entire disclosure of all of the above listed PCT and provisional applications is expressly incorporated by reference herein. However, this disclosure describes a means of separating the isothermal removal of heat in the cooling exchanger from the adiabatically compressed working fluid of the working cycle.

The entireties of related U.S. Pat. Nos. 4,698,973, 4,938,117, 4,947,731, 5,806,403, 6,505,538, U.S. Provisional Applications Nos. 60/506,141, 60/618,749, 60/807,299, 60/803,008, 60/868,209, and 60/960,427, and International Applications No. PCT/US05/36180 and PCT/US05/36532 are also incorporated herein by reference.

BACKGROUND

The most efficient heat engines to date, Stirling engines, invented 200 years ago, lose 30% efficiency because they expand and compress their internally cycling working fluid from the volumes incasing their heating and cooling exchangers, and hence their fluid is heated and cooled isothermally during the stroke so that some of the added heat cannot be fully converted to their full work output potential.

Ever since, thermodynamic specialists have sought ways to retrieve the balance. The Second Law states that heat always flows from a higher to a lower level. Some specialists have confused this quest by interpreting the Second Law of Thermodynamics to mean a fluid cannot be cycled from a low to a high energy level. In fact, to be adiabatic, a bolus of cycled working fluid must be cycled to a higher level before being batched and expanded. The Soony engine does not pass its heat from a low to a high level, breaking the Second Law. Rather its working fluid cycles from a balanced low pressure environment to a balanced high pressure environment much like a boat passes through a canal lock. When raised, the raised level is used to power the next downstroke. After cycling, heat is added to the cycled fluid from an outside source.

Hundreds of billions of dollars worth of heat energy could be converted into electricity every year, if a cost efficient heat-driven generator were developed. The Carnot principle indicates that a set amount of energy is available within a given temperature range for heat to power conversion if a way can be found to use it.

SUMMARY

In one or more embodiments, an adiabatic expansion heat engine comprises a piston chamber, a power piston and a fluid pump. The power piston is moveable within the piston chamber, running on working fluid in a high pressure state receivable from a heating exchanger and for exhausting the working fluid in a low pressure state. The fluid pump transfers the working fluid in a lower pressure state back to the high pressure state of the heating exchanger. The fluid pump comprises a pump piston diaphragm, an expansion chamber and a pump chamber which are disposed on opposite sides of the pump piston diaphragm, and by the movement of the diaphragm, alternately defining the volumes of the expansion chamber and the pump chamber, therein at the beginning of a downstroke of the power piston, the opening of the expansion chamber displaces the closing of the volume of the pump chamber during recycling. The diaphragm as disclosed herein has a conical frustum shape. The expansion chamber and the piston working chamber fluidly communicate to define together a working chamber for adiabatic expansion of the working fluid (Stage 1), which is monitored by the herein disclosed conical frustum shaped inlet valve.

After the expansion downstroke, a means is disclosed of cooling the expanded working fluid at BDC (Stage 2). The working chamber is controllably, fluidly communicable with the pump chamber during an upstroke of the power piston for adiabatically compressing the working fluid from the low pressure state into the higher state in the pump chamber (Stage 3), while simultaneously isothermally compressing the balance of fluid back into the cooling exchanger, thus removing heat and containing that cooled fluid to be released at the bottom dead center position (BDC) of the next cycle. Stated again, BDC cooling is achieved by: a) a disclosed means of, during the previously compression upstroke, compressing a portion of the fluid in the working chamber into the cooling exchanger during the upstroke so that its fluid was isothermally cooled, b) a disclosed means of containing that fluid during the previous downstroke, and c) a disclosed means of releasing that fluid at BDC into the working chamber, supercooling the expanded working fluid before recompression.

So, after BDC cooling, the disclosure also teaches a means of achieving near adiabatic compression during the upstroke into the pump volume (stage 3) that will insure that the same quantity of fluid being pressed into the pump is equal to the quantity of fluid in the initial bolus that was initially injected at TDC into the expansion chamber from the hot heat exchanger as described in previous patents. In this, disclosures (stages 2 and 3) herein teach a means of achieving the above equal quantity balance in the pump and expansion chamber by balancing the density ratio between the pump and cooling exchanger volumes so that the appropriate amount of heat is absorbed in the cooling exchanger and so, by sizing the internal volume of that cooling exchanger, achieving the appropriate "stage 2 BDC cooling" before the next "stage 3 adiabatic compression of an equal amount of fluid into the pump as was injected in the initial bolus."

As taught in the previous patent, when the power piston is at or near a top dead center (TDC) thereof, pressures on opposite sides of the pump piston diaphragm are equalized by the working fluid in the high pressure state metering from the heating exchanger, thereby creating a balanced environment surrounding the diaphragm, minimizing the resistance of the flow of the working fluid being pumped, allowing the transfer of cycled fluid to flow from a previously lower pressure state in the pump chamber back to the high pressure state of the heating exchanger (stage 4). The diaphragm disclosed herein has a proprietary conical frustum shape.

In summary, the previous embodiments provided a method of operating the adiabatic expansion heat engine (Stage 1) and, through a balanced pressure environment surrounding the pump piston, allowing the working fluid in the pump to be cycled into the high pressure/temperature heat exchanger (Stage 4). This disclosure additionally teaches a means of cooling the expanded working fluid when at the bottom of the downstroke (BDC) (Stage 2) before recompression (Stage 3); and teaches a means of compressing near adiabatically the working fluid from the working chamber into the pump during the upstroke before cycling that working fluid out of that pump into the high pressure/temperature heat exchanger (Stage 4). The disclosure also teaches several means of minimizing the waste of residual working fluid during the cycling process in order to optimize the cycle efficiency.

BRIEF DESCRIPTION OF THE DRAWINGS

The described embodiments are illustrated by way of example, and not by limitation, in the figures of the accompanying drawings, wherein elements having the same reference numeral designations represent like elements throughout, unless otherwise specified.

FIG. 8 is a front and side view of Soony engine, describing in more detail the operation of the interior five valves of the cycle and the five interior volumes (expansion chamber, working chamber, pump chamber, cooling exchanger and hot heat exchanger) that contain the working fluid and promote the flow through those volumes during the cycle.

FIG. 9 shows the interior moving parts of the engine such as the working piston and its power train, and the cam/diaphragm mechanism and spindle valve, having a conical frustum shape, and how the diaphragm and spindle valve trains are driven by the torque of the main crankshaft.

FIG. 12 is a perspective drawing of the diaphragm (as viewed from below), showing in greater detail and in skeleton form the inner workings of the inlet valve and the workings of the valve connection between the cooling exchanger and working chamber, both mounted on the spindle frame. FIG. 12a shows a detail description of the workings of valve. FIG. 12b is a perspective (as viewed from above).

FIG. 13 addresses potential leakage problems, internally and into the atmosphere. Bellows are used to seal the diaphragm rod and the working piston. Another means is disclosed of returning leaking internal fluid to the cycling chambers.

FIG. 20 shows a four-cylinder version of the Soony engine (rear and front views), but demonstrates that any number of cylinders can be configured (as are common in engines that drive cars, trucks and large generators) with the sequence of strokes of these multi-cylinder engines being defined by the angular placement of their journals on their common driveshafts.

FIG. 21 shows a magnetic coupling that seals an earlier design version of the cam rod, preventing leakage, but also a magnetic couple can be applied to seal other openings such as a seal along the bevel gear shaft between the interior volume of the spindle valve frame and outside atmosphere or a seal along the main crankshaft preventing leakage to the outside atmosphere.

DETAILED DESCRIPTION

Figure 1:
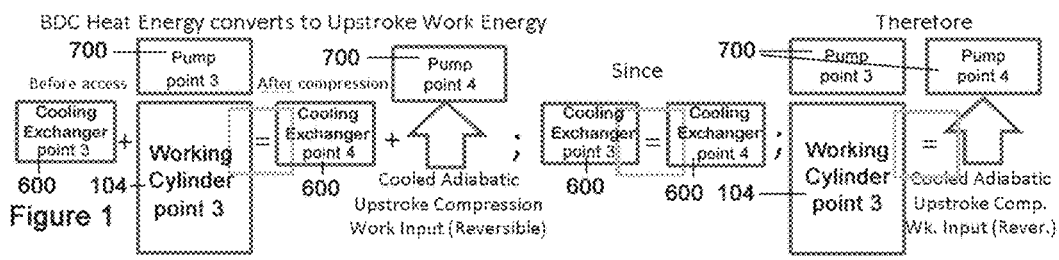
FIG. 1 is a schematic diagram demonstrating that the effect of any adiabatic expansion or compression happening in the system without loss or gain of heat is an equivalent to an equal heat and work exchange, meaning that, because the same condition exists in the cooling exchanger at TDC as at BDC before release, except for lowering the temperature with that BDC release, those TDC and BDC cooling exchanger conditions cancel one another out so that the net effect of the compression into the pump is adiabatic.

In the following detailed description, for purposes of explanation, numerous specific details are set forth in order to provide a thorough understanding of the specifically disclosed embodiments. It will be apparent, however, that one or more embodiments may be practiced without these specific details. In other instances, well-known structures and devices are schematically shown in order to simplify the drawings.

A near adiabatic engine has four stages in a cycle: (1) a means of adiabatically expanding the working fluid during the downstroke from a high pressure/temperature level to a low level; (2) a means of cooling the working fluid at Bottom Dead Center (BDC); (3) a means of adiabatically compressing that fluid from a low pressure/temperature level at BDC to the higher level at Top Dead Center (TDC); and finally, (4) a means of passing that working fluid back to the high pressure/temperature source in a balanced pressure environment so as to minimize the resistance of that flow. This disclosure builds on the lessons learned in (1) and (4) both which were patented in U.S. Pat. No. 8,156,739 issued Apr. 17, 2012, but are improved on herein. This disclosure teaches the means of achieving (2) and (3) as follows: (2) a means is disclosed of BDC cooling of the expanded working fluid in the working chamber, and (3) a means is disclosed of adiabatically compressing the working fluid into the pump chamber before cycling the fluid.

The cycle operates as follows:

(1) In Stage 1, the Soony mechanism injects a hot, high pressure bolus of working fluid (air) 703 from the hot heat exchanger 500 into the expansion 702 volume which is defined by the upward displaced movement of the diaphragm 113 as taught in previous patents. The bolus is isolated from the hot heat exchanger 500 with the closing of the inlet valve 121 on the cup-shaped spindle frame 130, having a conical frustum shape, and the working fluid 703 is expanded adiabatically from point 1 to 2 (Stage 1), driving the power piston 103 down to Bottom Dead Center (BDC) as taught in previous patents.

(2) In Stage 2 at BDC, the appropriate amount of heat used during that downstroke is removed as follows: At BDC (point 2 to 3, Stage 2), two valves 122 and 124 open, allowing cold, pressurized fluid (from the cold reservoir (C.R.) prepared during the previous upstroke) to flow into the working cylinder (W.C.$_{BDC}$). The flow passes from the cooling exchanger 600 through ports 124 located at the bottom of the working cylinder when uncovered by the movement of the working piston, and by flow that passes through opened ports 122 located at the top of the working cylinder 104, opening when the working piston 103 approaches BDC. Simultaneously, the diaphragm (pump piston) 113 moves downward in a balanced pressure environment to define the pump chamber volume 701.

3) From points 3 to 4 (Stage 3), the working piston 103 adiabatically drives the working fluid 703 out of the working cylinder 104 into the pump volume 700 above the diaphragm 113 through reed valves 125 located on the inside upper face of the cup-shaped diaphragm 113, while pressing the remaining working fluid 703 back into the cooling exchanger 600 for recooling. With the rising compression and low temperature condition, due to the increasing density at a constant low temperature, the process isothermally removes the heat in the fluid being compressed into the cooling exchanger 600. Simultaneously, the isolated condition in the working chamber 104 and pump 701 allows for near adiabatic compression during the upstroke into the pump 701 for recycling. Reed valve 125 on the diaphragm 113 and reed valve 126 at the hot heat exchanger 500 entrance ensure unidirectional flow through the pump cavity 701.

4) In Stage 4, the working fluid 703 is cycled back to the hot heat exchanger 500, where heat from the hot heat exchanger 500 transfers into the cycled working fluid 703. Simultaneously, the valve 121 on the rotating spindle frame 130 opens, allowing hot, pressurized fluid to flow into the defined pump cavity 701 between the top face of the working piston 103 (at TDC) and the bottom face of the diaphragm 113, and the cycle begins again.

Why the Soony Engine is Near Adiabatic

Reason 1—As taught in previous patents, the downstroke is adiabatic because the working fluid 703 is isolated and expanded (Stage 1).

Reason 2—At BDC, the appropriate amount of heat used during the downstroke work output is removed by injecting the cold fluid from the cooling exchanger 600 (Stage 2). Actually, the appropriate heat removal amount must be sufficient to achieve the ideal adiabatic upstroke which does not include all the heat used during the downstroke. The cooling exchanger 600 heat was isothermally removed by the previous compression of that fluid into the cooling exchanger (C.R.) 600 during the previous upstroke (from Point 3 to 4, Stage 3). And the balance was adiabatically compressed into the pump chamber 701 for recycling. During the next downstroke from TDC to BDC, this retained, compressed, cool fluid in the cooling exchanger 600 is released into the working chamber 104 at BDC, supercooling the expanded working fluid 703, bringing the mean temperature/pressure down to the ideal low temperature/pressure level (Stage 2). Thus, after being accessed to the working chamber 104, the BDC temperature and pressure reach the ideal Carnot bracket level.

(Looking at FIG. 1) Since an ideal adiabatic cycle is reversible, heat potential can be converted to work output, and work input can be converted into heat potential, $\Delta Q = \Delta W$. Further, heat removal at BDC will bring the pressure/temperature conditions in the working chamber 104 down to an ideal sink level before recompression.

| | Temperature (K) | Pressure (MPa) | Density (kg/m³) | Volume (m³/kg) | Int. Energy (kJ/kg) | Enthalpy (kJ/kg) | Entropy (kJ/kg-K) | Cv (kJ/kg-K) |
|---|---|---|---|---|---|---|---|---|
| Expansion Ratio - 5 times expansion (Using air as the working fluid 703) | | | | | | | | |
| Point 1 | 921.98 | 2.3304 | 8.7364 | 0.11446 | 818.71 | 1085.5 | 4.1613 | 0.83929 |
| Point 2 | 510.95 | .25656 | 1.7473 | 0.57230 | 493.93 | 640.76 | 4.1613 | 0.74486 |
| Point 3 | 294.20 | .24770 | 2.9350 | 0.34072 | 335.82 | 420.22 | 3.6103 | 0.71825 |
| Point 4 | 556.16 | 1.4022 | 8.7367 | 0.11446 | 526.88 | 687.37 | 3.7599 | 0.75510 |
| Cool Ex. | 294.20 | 1.4022 | 16.676 | 0.059967 | 333.44 | 417.53 | 3.1046 | 0.72117 |

According to the Chart:

$W_{out}$=1085.5−640.75=444.75 kJ/kg(Point 1 to Point 2, Stage 1)

$W_{in}$=420.45−687.37=−266.92 kJ/kg(Point 3 to Point 4, Stage 2)

$\Delta W$=444.75−266.92=177.83 kJ/kg $Q_{out}$=640.75−420.45=220.3 kJ/kg(Point 2 to Point 3, Stage 3)

$Q_{in}$=687.37−1085.5=−398.13 kJ/kg(Point 4 to Point 1, Stage 4)

$\Delta Q$=−398.13+220.3=−177.83 kJ/kg

The Cooling Exchanger Design

Using air as the working fluid 703, note that: $W_{in}$ (compression work between Points 3 and 4, Stage 3) is roughly equal to $Q_{out}$ (which is the appropriate heat removal between Points 2 and 3), i.e., −266.92 kJ/kg≈220.3 kJ/kg. Note here that $W_{out}$ (which is the expansion downstroke work between Points 1 and 2, Stage 1) is roughly equal to $Q_{in}$ that's added between Points 4 and 1 (Stage 4) in the hot heat exchanger 500, i.e., 444.75 kJ/kg≈−398.13 kJ/kg. Therefore, the heat removal occurring in the cooling exchanger 600 is roughly equal to the anti-work occurring during the upstroke. Actually, the isothermal heat removal is greater than the actual heat removal requirement at BDC.

To determine the heat removal in the cooling exchanger 600, let us compare this said heat removal in the cooling exchanger 600 to the adiabatic heat buildup in the pump chamber 701: 687.37−417.53=269.84 kJ/kg. From Point 2 to Point 3 (Stage 2), the needed heat removal per kg within the desired 294° K to 510.87° K range is: $h_2-h_3=Q_{out}$=640.76−420.22=220.54 kJ/kg. Because the compression into the cooling exchanger 600 is converted into heat removal only and because the heat removal requirement at BDC between Points 2 and 3 (Stage 2) is 220.3 kJ/kg, the equivalent heat removal in the cooling exchanger 600 (−269.84 kJ/kg) is significantly greater than the requirement for heat removal at BDC (220.3 kJ/kg). As a note, the heat that must be added in the hot heat exchanger 500 between Points 4 and 1 will be greater than the work output of the working piston 103 during the downstroke between Points 1 and 2 (Stage 1). However, since the heat removal (occurring in the cooling exchanger 600) is greater than the heat removal requirement at BDC, the absorption efficiency in the cooling exchanger 600 can be less than 100% (considering losses due to the approach). This is realistic and allows the system to adequately remove the required heat at BDC before beginning the upstroke.

The exothermal heat removal during the isothermal compression in the cooling exchanger 600 causes a density increase at the constant low temperature, which is 16.676/8.7364=1.9094 times the density of the adiabatically compressed fluid into the pump chamber 701. Also, the relative mass in the pump of 1 unit as compared to the relative mass inside the cooling exchanger is 16.676/8.7364=1.909 times the mass in the pump. In summary, if the approach efficiency of the cooling exchanger is 95% efficient, the cooling exchanger size 1×0.95/1.909=50% the unit size of the pump, which is large enough to remove up to 269.84 kJ/kg of heat, which is more than enough to remove the 220.54 kJ/kg requirement to insure an optimum adiabatic upstroke.

The total BDC volume will be: $V_{All\ at\ BDC}=V_1+V_2+V_{3/4}$=1(pump)+4(W.C.)+0.5(C.R.)=5.5 units. Before mixing, numeral factor caused by mixing the fluids in the cooling exchanger and the working chamber=$C.R._{BDC}$+$W.C._{BDC}=p_4V_4/C_v\ T_4+p_{1/2}V_{1/2}/C_v\ T_{1/2}$ with constant=mR or nR. The numeral factor=1.2859×0.51/0.72117×294.2)+0.25656×5/0.74486×510.87)=0.003091+0.003371=0.006462, with $V_{All\ at\ BDC}=V_1+V_2+V_{3/4}$=1+4+0.5=5.5 units, including the 1 unit of the pump volume. Calculating the BDC temperature and pressure using this numeral factor, $p_4V_4/C_v\ T_4+p_{1,2}V_{1,2}/C_v\ T_{1/2}$=0.006462, replacing mR with relative densities. If the ideal Carnot bracket temperature is: T=294.2° K, then the BDC pressure is calculated to be: $p_{released}$=0.7180$T_{released}$×0.006462/$V_{released}$=0.24773 MPa.

Variations in the properties in the working cylinder 104 over the course of a cycle are shown in the below Table. Note the 'relative density' is the densities at various points of a cycle divided by the TDC density in the expansion chamber 702 or in the pump chamber 701, which are the same. Therefore, Relative density=density at point x/density in the pump chamber 701. FIG. 1 demonstrates how the same condition in the cooling exchanger at TDC matches the condition in the cooling exchanger 600 at BDC, right before releasing its pressurized cool fluid into the working chamber 104. Since the conversion of heat to work in an adiabatic cycle is reversible, that conversion back and forth of heat to work or work to heat, without any outside intervention, can be considered equivalent. Hence, the effect of the condition happening in the cooling exchanger 600 on the total system results in causing a lowering the temperature/pressure condition of the working fluid at BDC. But, since the condition in the cooling exchanger 600 at TDC is the same as the condition in the cooling exchanger 600 at BDC before release, if properly sized, these cooling exchanger 600 conditions cancel one another out, and the end result on the total system will have the net effect of lowering the temperature before achieving adiabatic compression into the pump chamber volume 701.

Another important consideration is that the layout of this disclosed engine design is configured so as to minimize dead internal volumes wherever flow of the working fluid 703 within the engine 400 occurs so as to minimize the residual volumetric losses and hence the waste in the efficiency of the heat/work conversion during the cycle of the working fluid 703 in the engine 400. This disclosure teaches several means of minimizing and eliminating these dead internal volumetric losses. These means are equivalently and equally as critical to the successful operation of the engine 400 and thereby significantly contribute to the patentablity of this disclosure, as much as any other breakthrough disclosure aspect herein described, i.e., the means of eliminating dead volumes is equivalent to the means of BDC cooling of the expanded working fluid 703 and the means of the adiabatically compressing the working fluid 703 during the upstroke into the pump chamber volume 701 as herein described.

The below table is derived from above calculations and from NIST Profprop.

heat exchanger 500; 2) the BDC port opens when the working piston 103 nears the BDC position and uncovers the BDC ports, exposing access of pressurized cold fluid from the cooling exchanger 600 to the working cylinder 104 (in tandem with the opened valve 122); 3) the valve 122 between the working chamber 104 and the cooling exchanger 600, located at the TDC position, remains open during almost the entire upstroke, allowing fluid in the working chamber 104 to be compressed back into the cooling exchanger 600; and 4) the unidirectional check valve 125 accesses flow from the working chamber 104 into the pump chamber volume 701. A fifth check valve 126, exiting the pump chamber volume 701, provides unidirectional flow out of the engine 400 through the pump chamber volume 701 back into the high pressure/temperature hot heat exchanger 500.

TABLE

| Points in the Cycle | Volume cm* | Relative Density | P in MPa | T in °K | Internal Energy kJ/kg | J/stroke | J/stroke |
|---|---|---|---|---|---|---|---|
| Cycle | | | | | | | |
| Point 1 - hot bolus | 114.05 | 1 | 2.3304 | 922 | 818.71 | Chart | Calculated |
| Point 1 to 2 - Working Chamber | 0 to 456.2 | 1 to .2 | 2.3304 to .2556 | 922 to 510.87 | 818.71 to 493.93 | | |
| Point 1 to 2 - Downstroke | 114.05 to 570.25 | 1 to .2 | 2.3304 to .2556 | 922 to 510.87 | 818.71 to 493.93 | −324.8 | −293.01 |
| Point 1 to 2 - Cool Reservoir | 58.17 | 1.9094 | 1.402 | 294 | 333.44 | | |
| Point 2 to 3 - Accessing Cool Res | 570.25 to 628.42 | 1.9094 to .35475 | .2556 to .2477 | 294 to 211 | 333.44 | −157.9 | −160.6 |
| Point 3 - Total BDC | 628.42 | 0.35475 | 0.2477 | 211 | 333.44 | | |
| Point 3 to 4 - Upstroke to Pump | 628.42 to 114.05 | .35475 to 1 | .2477 to 1.402 | 294 to 556.16 | 335.82 to 526.88 | 190.82 | 186.32 |
| Point 3 to 4 - Cool Reservoir | 628.42 to 58.17 | .35475 to 1.9094 | .2477 to 1.402 | 294 | 333.44 | | |
| Point 4 - Pump | 114.05 | 1 | 1.402 | 556.16 | 526.88 | | |
| Point 4 to 1 - Reheating | 10,000 | 1 | 2.3304 | 556.16 to 922 | 526.88 to 818.71 | 291.83 | 271.68 |

Properties

Reason 3—As seen from FIG. 1, the pre-access BDC (C.R.2) and post-pressurized TDC (C.R.4) conditions in the cooling exchanger 600 are the same. When determining the p-V work input $\Delta W = \Delta F \Delta d$, the upstroke length $\Delta d$ (from points 3 to 4, Stage 3) is the same. The temperature in the cooling exchanger 600 remains a constant 294° K with its density rising to 1.9094 times the density in the high energy pump, balancing the pressure buildup ($\Delta p$) in the pump, matching the progressive buildup of force ($\Delta F$) required to achieve an ideal adiabatic upstroke.

Reason 4—At TDC, the working fluid 703 passes back into the hot/high pressure heat exchanger 500 in a balanced pressure environment, much like a boat passing through the gates of a canal lock. The diaphragm 113 oscillates a short distance back and forth, actuated by a spring force 709 overcoming the inertia of the diaphragm mechanism, as previously patented.

The Valving Interchange of the Working Chamber and the Flow Capacity of the Disclosed Model The opening of the inlet valve 121 must provide optimum flow from the hot heat exchanger 500 to the expansion chamber 702. The featured model is designed with bevel gears 151 and 152, having a 1/6 ratio and the spur gears 153 and 154, having a 1/5 ratio, providing an overall 1/30 gear ratio between the valve spindle 130, having a conical frustum shape, and the cam rod 801. The cam rod 801 is driven by the 1/1 ratio with the driveshaft 141. Four valving mechanisms interact with the working chamber volume 104: 1) the conical frustum shaped spindle frame 130 with its inlet valve 121 allows for the TDC injection from the hot The Valves:

1) The upper portion of the rotating cup-shaped or conical frustum shaped spindle frame 130 houses valve 121 which has 30 slit openings, spaced on average ~20 mm apart with an average opening of 0.8345 mm×63 mm, moving within an average 1.25 mm×63 mm fixed opening through the walls of the valve mechanism 130. At 1800 RPMs, the spindle 130 with its 30 slits rotates one complete rotation per second. Since the gear ratio for the bevel gear is 1/6 and the gear ratio for the spur gears is 1/5, as explained, both provide a 1/6×1/5=1/30 overall ratio. Since the belt pully ratio between the cam and crank shaft is 1 to 1, a 30 ratio×60 seconds provides 1800 RPMs. As the spindle moves across openings with a slit area of 52.526 mm$^2$, 30 such slits provides a 15.758 cm$^2$ total opening, but, as designed, the fixed openings housed in the sandwiching walls of the valve are 1.25 mm (average)×63 mm=78.75 mm$^2$ each. 30×78.75=23.63 cm$^2$ total opening. In effect, a moving opening of 15.76 cm$^2$ is open 23.63/15.76=144% greater, plus the progressive opening and closing of the moving 15.76 cm$^2$ would effectively add a 15.76/2=7.8 cm$^2$ greater opening or a total effective opening of 1.44(15.76)+7.8=30.5 cm$^2$ per TDC opening (or 4.73 in$^2$) which is considerable. As such, if the required openings does not need to be as generous, the impact of a tighter cosign on the TDC action would improve. For example, if the TDC action straddles TDC with a 15 degree approach and a 15 degree decent, the cosign would be 15 degree Cosign=96.6% for the adiabatic expansion. But, if the timing of the TDC opening is reduced to a 11.84 degree Cosign, the system would improve to a 97.9% adiabatic range.

2) Approaching BDC, BDC ports 124 allow the rapid flow of the pressurized cold fluid in the cooling exchanger 600 back into the working chamber 104. With a 30 degree rotation of the crankshaft 141 at BDC and with a 7 mm tube diameter, each opening would have a 38.5 mm$^2$ opening aperture. 38.5×30 openings would be a total of 11.55 cm$^2$ which is a 1.8 in$^2$ opening. If the rotation range at BDC has a tighter cosign angle, this would decreases the time exposure of the opened ports 124 at BDC but would improve the engine efficiency.

3) The valve opening 122 between the working chamber 104 and the cooling exchanger 600 can easily have a maximum aperture of 8 cm$^2$, which is nearly 1.24 in$^2$. This is done by opening the traveling aperture of the spindle frame 130 to the equal area of the stationary openings of the casing frame of the engine 400. With the moving aperture equal to the fixed opening, valve opening 122 to the cooling exchanger 600, located at the TDC position, would have a 0.3 cm×0.889 cm=0.2667 cm$^2$/opening or, with 30 slits, a total opening of 0.2667 cm$^2$×30=8 cm$^2$, 1.24 in$^2$. The quantity of fluid flow through valve 122 would be minimized at the end points of the stroke, at TDC and BDC, but maximized during the middle of the stroke, accommodating the progressive and regressive opening need of valve 122 during the upstroke.

4) The check valve 125 from the working chamber 104 to the pump chamber volume 701 provides unidirectional flow into the pump chamber 701 during the compression upstroke. A sequential timing must occur to insure that check valve 125 remains closed during the pumping action, so as, at the beginning, with the closing of valve 122 between the cooling exchanger 600 and working chamber 104, the cam 802 releases the diaphragm 113 mechanism that closes pump chamber volume 701 before opening of the inlet valve 121 on the spindle frame 130. Said again, to insure check valve 125 remains closed during the pumping process, the cooling exchanger valve 122 must close momentarily before the cam 802 releases the diaphragm 113, allowing the diaphragm 113 to move upward, before the inlet valve 121 on the spindle frame 130 opens.

The Containment Furnace

This disclosure also embodies the design of a containment furnace that provides the heat that drives the disclosed engine 400 and its generator. Encased inside a light-weight silicone shell material, the furnace 900 uses an interior conventional heat exchanger 500 to feed heat to the engine 400. The furnace 900 is fired up using a conventional furnace gas/air nozzle 903. Heat is drawn off the interior heat exchanger 901 (the heat exchanger 500) as the engine receives its boluses of hot working fluid 703, driving the engine cycles. As that fluid cycles, its heat energy is converted to work output, and is returned to the containment furnace 900 for reheating through port 123 from the engine 400 to port 905 of the furnace. Any fumes exhausted from the containment furnace 900 pass through the exit flue 906, and flow into and through the hot water heat and HVAC as needed. (See FIG. 15)

Preventing Engine Lock when Idle

When the engine stops, unavoidable leakages will seep into and out of the internal volumes of the engine 400—into and out of the working chamber volume 104, of the cooling exchanger volume 600, of the expansion chamber volume 702, and of the pump chamber volume 701. These leakages will allow the high pressure fluid in the hot heat exchanger 500 to flood the system. When this happens, when the working fluid 703 in the engine 400 is not in its cycling mode, the engine 400 will tend to lock up. To prevent such lockage, a bridge valve 200 may be installed between the expansion chamber 702 and the pump chamber 701 volumes that will open when the engine 400 stops and close gradually as the engine starts up. Another solution may be to install a shutoff valve 201 that closes and contains the high pressure fluid in the hot heat exchanger 500 while the engine 400 is not operating. When the engine 400 starts up again, that valve 201 would open, allowing the cycle to begin again. A balanced-pressure environment must surround the diaphragm 113 before the startup process will function properly. The engine 400 must be allowed a buildup of a full pressure differential before startup. The diaphragm check valve 125 may automatically serve as a substitute means replacing the need for adding a bridge valve 200 between the working chamber 104 and the pump chamber 701. If such a substitute is not workable, then an attached bridge valve 200 will need to be integrated into the engine design that will close when the engine is in operation. In contrast, the shutoff valve would need to open upon startup so as to allow the high pressure/temperature fluid from the hot heat exchanger 500 to enter the engine 400.

The Steps of the Engine Cycle (as described in FIGS. 2-5)

Figure 2:
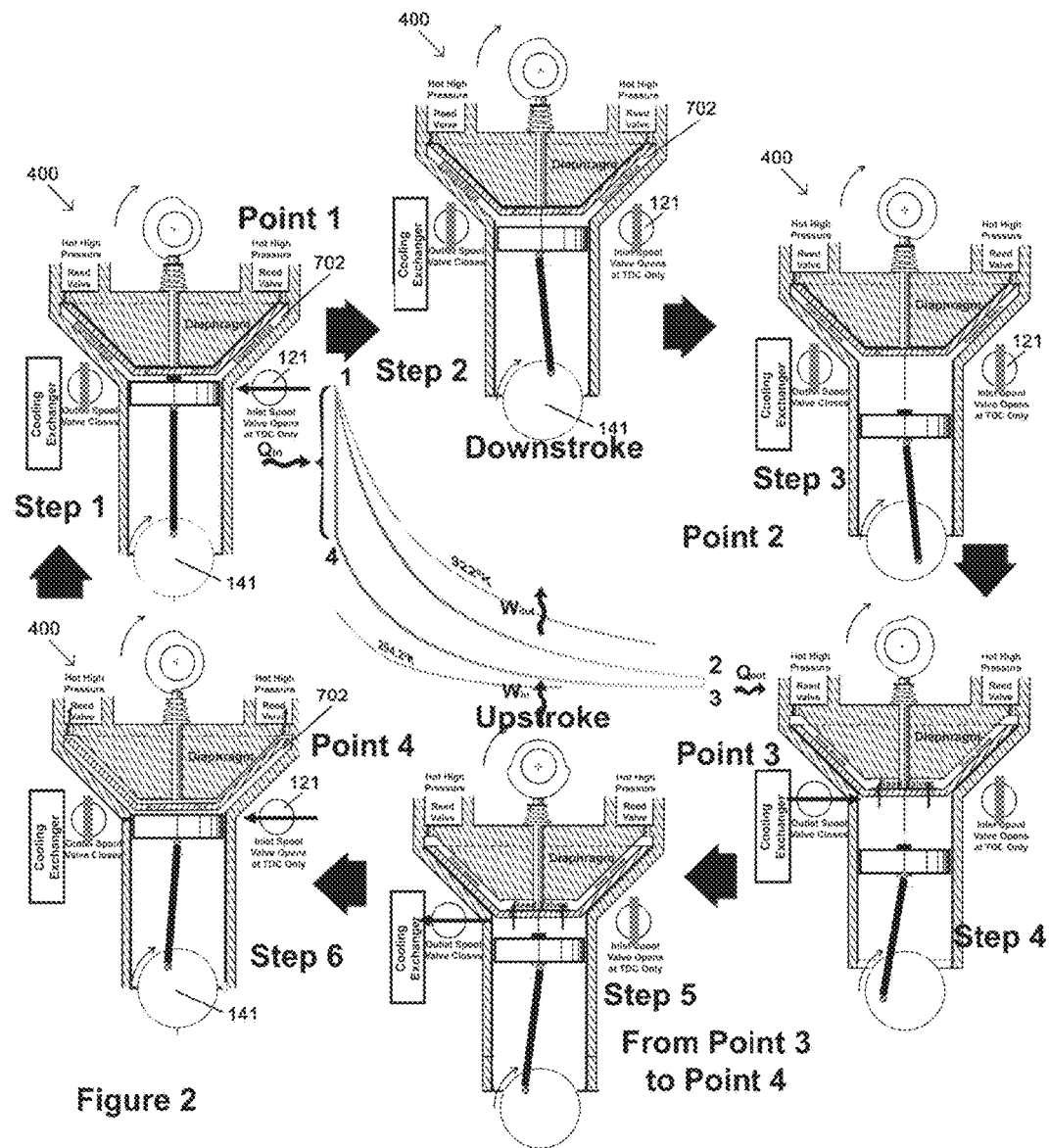
FIG. 2 is a schematic diagram showing the six steps of the cycle as they compare to the four points in the work/volume/thermal cycle as shown on the p-V diagram.

Step 1, as referenced to in the p-V diagram of FIG. 2, begins at point 1, at TDC, when the expansion chamber 702 defines the volume that is caused by the upward displacement or movement of the diaphragm 113. That defined volume is filled with the high pressure/temperature working fluid 703 from the hot heat exchanger 500. Filling of the expansion chamber 702 occurs with the momentary opening of the inlet valve 121 and the alignment of the 30 slit openings on the conical frustum shaped spindle frame 130. The total effective area of the openings of the inlet valve 121 of this designed model is 30.5 cm$^2$. A larger valve area for the opening (if needed for optimum flow) is doable. After inlet valve 121 from the hot heat exchanger 500 to the expansion chamber 702 closes, the working fluid 703 expands, forcing the working piston 103 downward. The stroke moves from point 1 to point 2 (Stage 1) as shown on the p-V diagram and in the schematic drawings.

Step 2 begins after the inlet valve 121 closes, when the working fluid 703 in the working chamber 104 adiabatically expands in isolation. This expansion continues until the working piston 103 almost reaches BDC. Since an adiabatic expansion is reversible, the isolated potential heat energy in the working chamber 104 is converted to real work output. Putting the same real work input back into the heat condition, recompressing the fluid without any outside interference or losses, converts the work back into heat potential. For example, if an equal amount of work is put back into the working chamber 104 through the anti-work of a recompression upstroke and if that recompression work on the working fluid 703 occurred without any heat addition or lost occurring either through the walls of the working chamber or otherwise, then that active compression work would be converted back into its original heat energy potential as was at TDC. To avoid recompression during the upstroke with equal work input, heat energy must be removed from the working chamber 104 at BDC after the working fluid 703 has expanded and before that working fluid 703 is recompressed. Although the temperature of the working fluid 703 drops with downstroke expansion, if the heat energy in that working fluid 703 is not removed by some outside source, recompression will require the same work input to return to the same level of heat potential.

Step 3 begins when the working piston 103 uncovers the BDC ports to the cooling exchanger 600 at near BDC, releasing pressurized cold fluid from the cooling exchanger 600 into the working chamber 104. As the piston cycle bottoms out at BDC and begins its upstroke, the diaphragm 113, that separates the expansion chamber 702 from the pump chamber 701, moves downward, fully opening the pump chamber volume 701. The injected cold fluid, that was released from the cooling exchanger 600 into the working chamber 104, removes heat from the working fluid 703, bringing the temperature and pressure down to the low sink level, matching points 2 and 3 (Stage 2) on the p-V diagram and as described in its drawings.

Step 4 begins with the compression upstroke at the cooler temperature and lower pressure. From point 3 to point 4 (Stage 3), the working fluid 703 is pressed into the provided pump chamber volume 701 above the diaphragm 113 divider, passing through check valve 125 that is located on the upper face of the cup-shaped diaphragm 113, while operating in a balanced pressure environment. Likewise, the fluid 703 in the working chamber 104 is pressed back into the cooling exchanger 600 through the open port 122, located at the top rim of the working cylinder 104. The access port 122 to the cooling exchanger 600 remains open during the entire upstroke and as is shown in the drawings of the upstroke from point 3 to point 4 (Stage 3). Note that the fluid being pressed into the cooling exchanger 600 is kept at the cool low temperature level, thus removing the heat energy so that the density in that fluid will rise to almost twice the density of the higher energy working fluid 703 being compressed in the pump chamber volume 701. In raising the density, heat in the fluid is removed and that cooled fluid is stored in the cooling exchanger, making ready for the next BDC injection and supercooling before the next upstroke recompression.

Step 5 begins when the upstroke almost reaches TDC. At this position, the access port 122 to the cooling exchanger 600 closes, and immediately afterwards, the cam releases the diaphragm 113 mechanism so that the tension spring 709 can force upward the diaphragm 113 action, retaining a pressure differential on the closed check valve 125 inside the fluid pump 700 volume. The rapid closing action of the diaphragm forces the check valve 125 to remain closed while the fluid pump 700 volume closes, assuring that the flow of the working fluid 703 will be unidirectional as the working fluid 703 in the cycle is forced back into the hot heat exchanger 500. As the fluid pump 700 is closed by the force of the spring 709, as the diaphragm 113 moves upward, the expansion chamber volume 702 (below the bottom face of the diaphragm 113) opens up, allowing an injection of a new bolus from the hot heat exchanger 500 into the engine 400. Note that the inlet valve 121 from the hot heat exchanger 500 momentarily opens, allowing the high temperature/pressure fluid to enter the opened expansion chamber volume 702, injecting a fresh bolus of working fluid 703, energizing the next downstroke. Note that this action occurs at TDC or at point 4 in the cycle and as is shown in the p-V diagram.

Step 6 occurs between points 4 and 1 (Stage 4) of the cycle, when the cycled working fluid 703 has been pushed out of the engine 400 and receives heat energy from the hot heat exchanger 500. As this transfer of working fluid 703 reheats in the hot heat exchanger 500, note that the hot heat exchanger 500 volume must be large enough so that the influx of the cooler working fluid 703 from the engine 400 does not significantly affect the pressure/temperature conditions in the larger hot heat exchanger 500 volume.

Regarding the working fluid, for this disclosure, air is used in this technical analysis. However, helium would be the working fluid for optimum heat to work conversion. Helium gas is suitable as an ideal working fluid because it is inert and very closely resembles a perfect gas, therefore providing the optimum heat to work conversion. Its boiling point is close to absolute zero, improving its Carnot potential, but its atoms are small and may cause leakage problems. The greater the viscosity, the less leakage will occur. Other suitable media include, but are not limited to, hydrogen and carbon dioxide.

EXAMPLE

Figure 17:
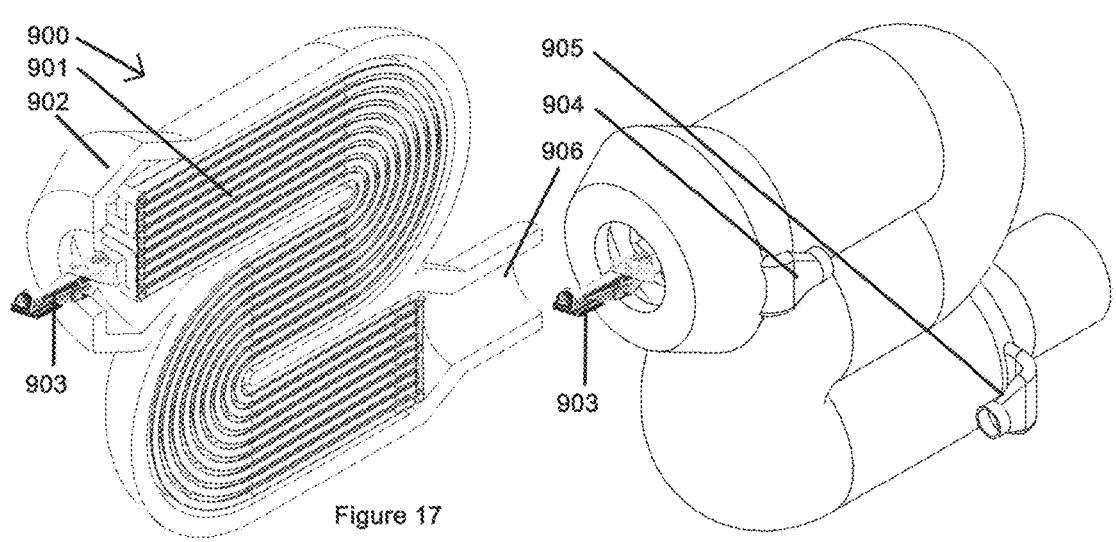
FIG. 17 describes the design of the exterior and interior construction of the containment furnace that contains the heat that drives the Soony engine.

The initial intended use of the Soony engine 400 and its disclosures is illustrated in FIG. 17. The Soony engine 400 is designed to drive a gas-driven home generator 1000. Any heat-driven home generator, that shares its heat with other furnace room appliances, will achieve exceptional efficiency, but, with a highly efficient Combined Heat to Power (CHP) engine such as disclosed, the cost-efficiency should triple. As shown, the disclosed gas-driven engine 400, driving a home generator, integrated into the home HVAC and hot water heater, is projected to achieve as much as 46% efficiency. This disclosed CHP engine, drawing it heat from a containment furnace 900 between 1230° F. and 742° F., with the heat flow through the furnace 900 controlled so as to optimize the system efficiency, further insures that nearly all the heat will be converted into usable energy. Overlapping and sharing heat between the Soony CHP unit and other furnace room appliances will insure that little additional heat will be required above the winter consumption of central heating and the summer consumption for cooling.

As a point of interest, the average summer cooling requirement is $\sim 1/3^{rd}$ that of the required heat for winter.

Small lawnmower and aviation SI engines, like Honda's Freewatt, are only 21.6% efficient. The WhisperGen, a Stirling engine, is awkwardly designed and achieves only 15% efficiency. Larger engines are generally more efficient. A four-cylinder Kockums, for instance, with 25-kW power, if reconfigured as a one-cylinder engine, would suffer $1/4^{th}$ the internal losses while generating 25/4 kW the power, approximately 6-kW power. The single-cylinder engine 400 herein disclosed, sized to the Kockums with a flywheel and an efficient alternator generator serving both as an engine starter and a generator, having 20% greater efficient, would have 7.5-wK power. A 2-kW Gas-Tricity generator for homes with a near adiabatic cycle, 20.1% mechanical and 5% thermal losses, and a projected 46% efficiency, would require 2.67-kW heat conversion.

FIG. 2 shows the steps in a cycle, its p-V diagram referencing the four points in the cycle. The steps are simplified so to better explain and help visualize the engine's operation. This disclosure describes an engine 400 with a spinning spindle valve 130 having 30 openings feeding into the engine 400 and 30 openings connecting the working chamber 104 to the cooling exchanger 600. The cup-shaped spindle 130 (rotating with its 30 inlet openings 121) momentarily opens access once every $1/30$ of a second. These 30 openings are housed in the spindle frame 130, providing 30 shutter openings per revolution per second. After the flow between the cooling exchanger 600 and working chamber 104 closes, openings of the inlet valve 121 align and synchronize to open the flow from the high temperature/pressure hot heat exchange.

DETAIL DESCRIPTION OF THE FIGURES

FIG. 1 illustrates the component and volumetric relationships inherent in a reversible heat/work exchange condition. Because the cycle is adiabatic, the heat/work exchange between the potential and kinetic energy can be considered equivalent. The heat to work or work to heat conversion back and forth can be considered inter-changable. The adiabatic/reversible heat and work conditions in the cycle herein mean that the effective kinetic work input in the working cylinder 104 from point 3 to point 4 (see FIG. 2) is equivalent to the potential heat condition in the fluid pump 700 at point 4. Thus in general, if no heat is added or removed to the working volume 104, the kinetic anti-work condition, completely compressing the fluid in the working cylinder back into the pump, would recreate the original potential heat condition in the pump. Considering that the temperature/pressure condition in the cooling exchanger 600 at point 2 (see FIG. 2) is the same temperature/pressure condition in the cooling exchanger 600 at point 4 (see FIG. 2), their equal effect have the effect of cancelling one another out, insuring that, in fact, if properly sized, the remainder of the compression during the upstroke will be adiabatic. To prove the point, let us cap off the two cooling exchanger TDC and BDC conditions, rendering those two conditions inactive. As related to the remaining condition in the working chamber 104 and in the fluid pump 700, the net effect of the kinetic work input would, in fact, be reversible and, as such, that work input during the compression upstroke between points 3 to 4 would be equivalent to the final potential heat energy condition in the pump at TDC. The drawing illustrates the point.

FIG. 2 shows six steps in an operational cycle of the engine. For simplicity and clarity, the steps herein focus on describing a single cylinder cycle of the engine 400, using a flywheel to carry the momentum through the compression upstroke. However, the engine concept and the principles and lessons taught herein are in no way limited to the configuration of a single cylinder engine. One major design concern for achieving optimum performance has been the configuration of the inlet valve 121 so as to supply sufficient flow of the initial bolus into the engine 400. Note that the recommended speed of the engine is 1800 RMPs, meaning that the crankshaft 141 of a single cylinder engine 400 will cycle 30 times a second. To achieve the optimum bolus condition in the expansion chamber 702, complete flow must be met within the 1/30 per second timeframe. The steps shown in FIGS. 2-5 describe a means of achieving such an optimum flow.

Figure 3:
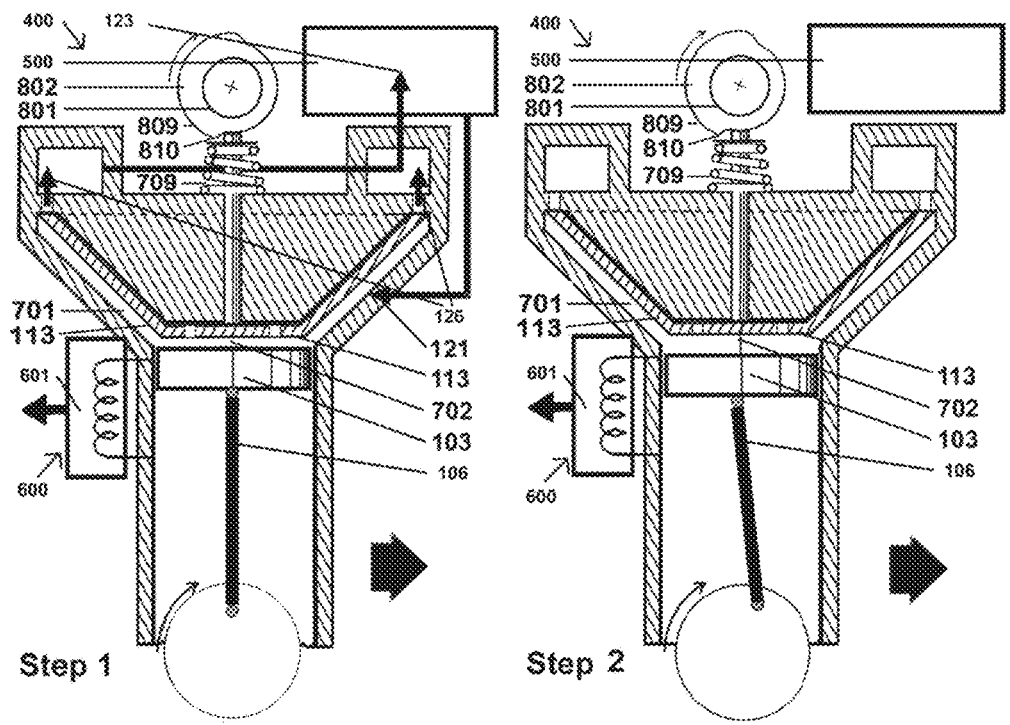
FIG. 3 describes, in Steps 1 and 2, the TDC action in preparation for the adiabatic expansion downstroke of the Soony engine cycle while retaining containment of the pressurized cool fluid in the cooling exchanger.

FIG. 3 describes, in Steps 1 and 2, the TDC action in preparation for the adiabatic expansion downstroke of the engine cycle. At TDC, the cam rod 801 rotates so that the riding surface 809 of the cam 802 passes its drop point 810 on that outer face 809, releasing the spring 709 force so as to force upward the diaphragm 113, thus closing the pump volume 701 while opening the expansion chamber volume 702. Simultaneously, the inlet valve 121 opens sufficiently to allow the expansion volume 702 to fill the said volume with a full bolus of high pressure/temperature working fluid 703 within the given timeframe. Step 2 shows that the inlet valve 121 shuts, isolating the injected bolus at near TDC so that the full bolus can expand in isolation, adiabatically moving the working piston 103 from the TDC to the BDC position.

Figure 4:
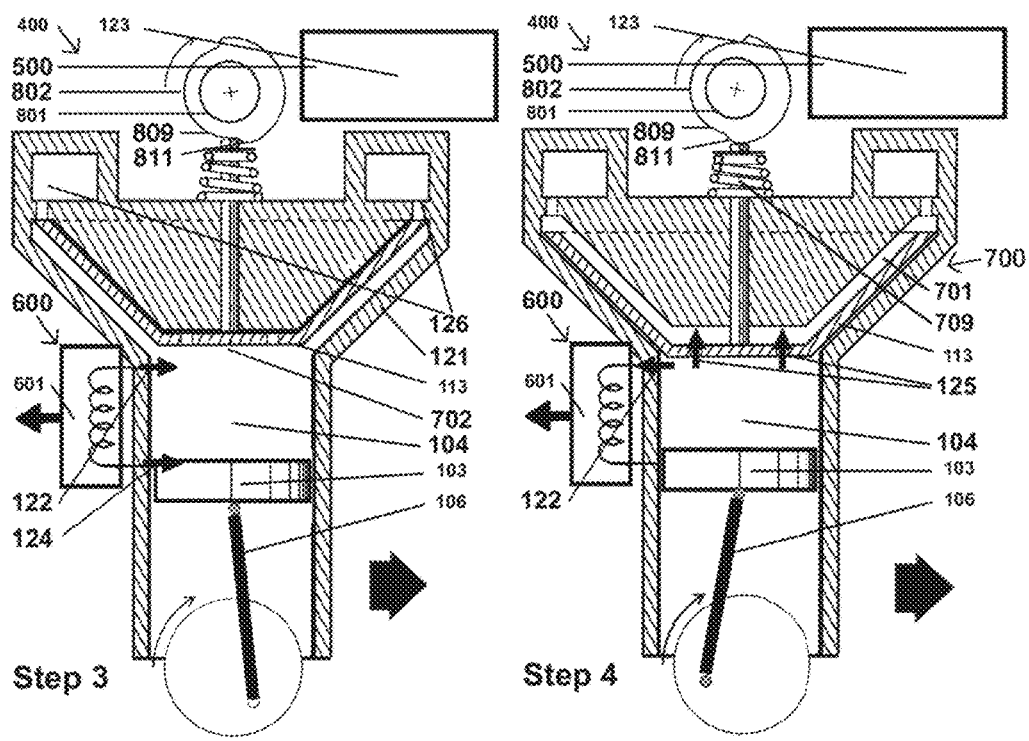
FIG. 4 describes, in Step 3 and 4, the working piston approaching the near BDC position, uncovering the BDC uniflow port and releasing the pressurized cool fluid in the cooling exchanger; and, in Step 4, cocking of the diaphragm mechanism, opening the pump volume and beginning compression of the cooled working fluid into the open pump and compression into the cooling exchanger.

FIG. 4 shows Steps 3 and 4. In Step 3, the working piston 103 approaches the near BDC position, uncovering the BDC uniflow port 124 between the cooling exchanger 600 and the working chamber 104, allowing flow from the cooling exchanger 600 into the working chamber 104, releasing high pressure, cold fluid into the working chamber 104 so as to supercool the adiabatically expanded working fluid 703 before the recompression upstroke. Note that the working fluid 703 cycles throughout all five chambers—the expansion chamber 702, the working chamber 104, the cooling exchanger 600, the pump chamber 701 and the hot heat exchanger 500. Note that the TDC port 122 also opens in tandem with the BDC port 124, allowing additional flooding of cold fluid from the cooling exchanger 600 into the working chamber 104. In Step 4, note that, at BDC, the cam 802 rotates to the slide position 811 on the outer surface 809, cocking the diaphragm mechanism while compressing the spring 709, opening the pump chamber volume 701 so that its working fluid 703 can be compressed into the open volume 701 of the pump 700 while also compressing the balance of the fluid back into the cooling exchanger 600. Step 4 also shows that, although BDC port 124 closes during the upstroke, TDC port 122 remains open during almost the entire upstroke approaching TDC, with the working fluid 703 pressed through port 125 into the pump chamber 701.

Figure 5:
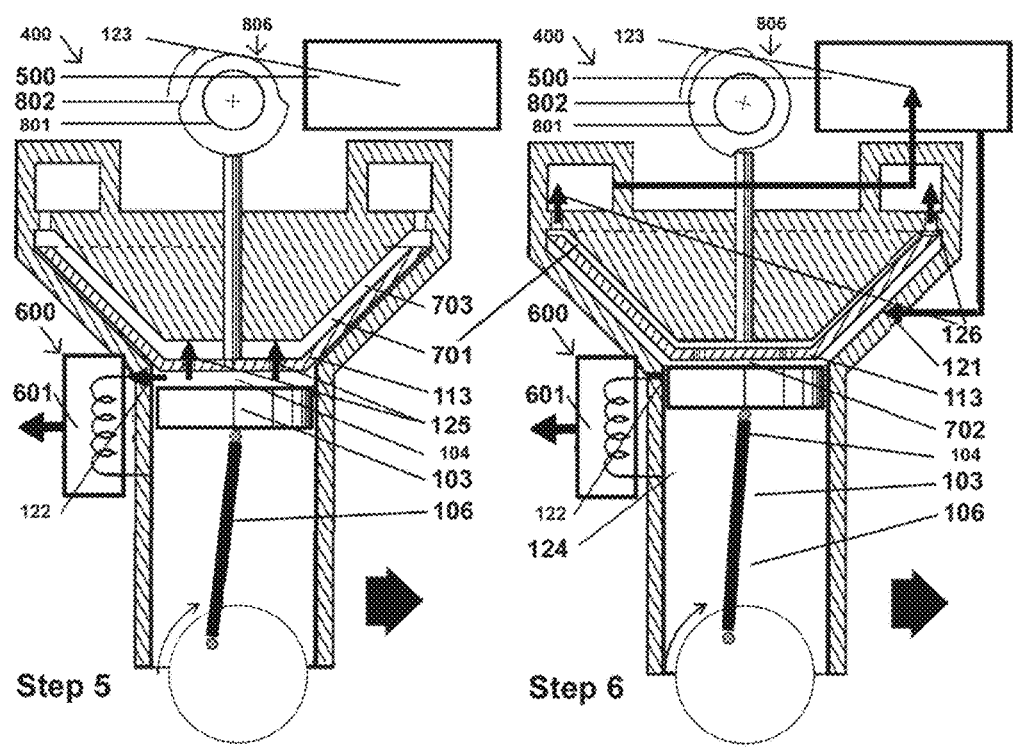
FIG. 5 describes, in Step 5 and 6, the TDC transition from an adiabatic upstroke (in which the working fluid was pressed into the pump volume while pressing the balance back into the cooling exchanger) and, in Step 6, the closing of the pump volume and the transferring of the working fluid from the pump into the hot heat exchanger in a balanced pressure environment while containing in the cooling exchanger the pressurized cool fluid for the next BDC cooling of the expanded working fluid.

FIG. 5 shows Step 5 and 6. The TDC transition from the isothermal heat removal in the cooling exchanger 600 and adiabatic compression into the pump chamber volume 701 of the upstroke to the operation of the circulation pump 701. At Step 5, the working piston 103 approaches TDC while still compressing the working fluid 703 into the pump chamber volume 701 and while still compressing the balance of fluid back into the cooling exchanger 600. The cooling water 601, flowing through the cooling exchanger 600, removes heat from the system as shown by the left pointing arrow. Note that the pump chamber volume 701 was compressed in isolation, insuring that the upstroke compression is adiabatic. Step 6 shows that the cam 802 releases the diaphragm 113 so that the pump volume 701 will close and the expansion volume 702 will open in a balanced pressure environment, fed through inlet valve 121, since both volumes are accessed to the high pressure/temperature hot heat exchanger 500. Note that the check valve 125 is kept closed by the compression caused by the rapid diaphragm 113 action, and that the working fluid 703 in the pump 701 is pressed back through check valve 126 into the hot heat exchanger 500 to complete the cycle.

Figure 6:
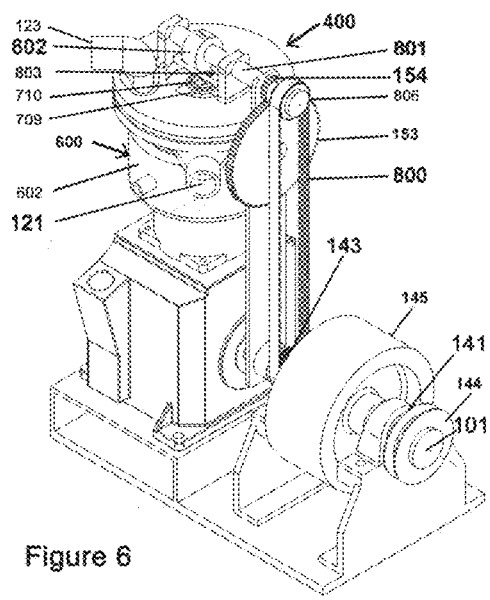
FIG. 6 is an isometric view showing the exterior of the Soony engine with its inlet port into the engine and its outlet port back into the hot heat exchanger whereas the working fluid is cycled through the engine so as to convert the available heat energy into optimum usable power output.

FIG. 6 describes the engine 400 configuration with its inlet port 121 attached to the hot heat exchanger 500 and an outlet check valve 126 (interior to the engine) which also accesses the cycling pump volume 701 (interior to the engine) to the hot heat exchanger 500, as previously patented. The two connections 121 and 126 provide simultaneous access to a balanced pressure environment surrounding the diaphragm 113 (interior to the engine) wherein the working fluid 703 (interior to the engine) is allowed to cycle through the engine 400 with minimum internal resistance, converting an optimum portion of the heat energy into usable power output 101. Note that the operation of the inlet valve 121 is driven by a belt 800 connection to the main crankshaft 141. Note that cooling exchanger 600 is positioned conveniently and snuggly around the outer wall of the working cylinder 104 (interior to the engine) to prevent dead volumetric waste pockets. Tubes 110 (interior to the engine) of the cooling exchanger are cooled by either the ambient air or water. Note that the power output creates torque on driveshaft 141 and on belt pully 143 which, through its belt pully 806 connection, drives the cam shaft 801, which, through the small spur gear 154 on the cam shaft 801, drives the large spur gear 153 that drives the inlet valve 121 (interior to the engine) and the valve of the cooling exchanger 122 (interior to the engine). The cam 802 also drives the oscillating movement of the diaphragm 113 (interior to the engine) that alternately defines the incoming expansion chamber volume 702 (interior to the engine) and the outgoing pump chamber volume 701 (interior to the engine).

Figure 7A:
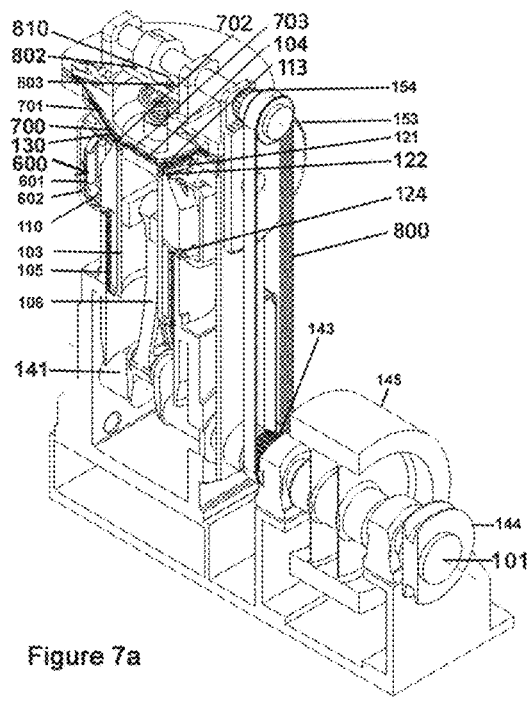
FIG. 7a is a cross-sectional view of the Soony engine describing the sequential operation of the five valves (the inlet, the connection, the BDC, and the two check valves of the pump) that control the internal flow of working fluid during the cycle.
Figure 7B:
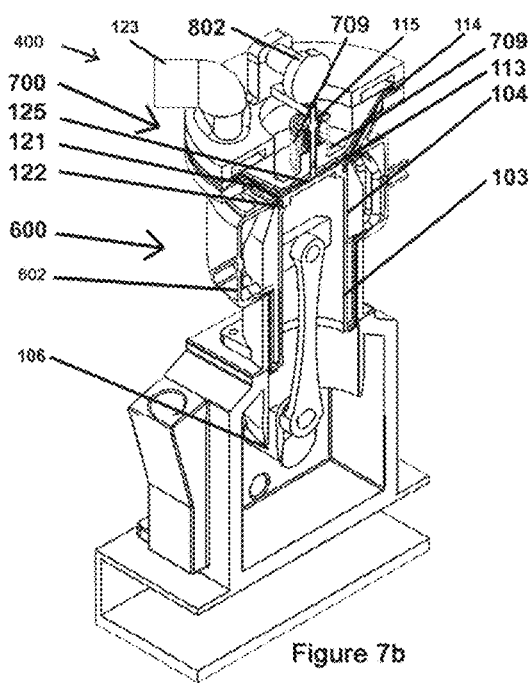
FIG. 7b is a cross-sectional view of the Soony engine, showing the interior workings of the engine, focusing specifically on the sequence of the connection valve to the cooling exchanger, the operation of the diaphragm with its cam, and the opening of the inlet valve from the hot heat exchanger as they insure the effective closing of the check valve to the pump as the pump closes.

FIG. 7a is a sectional drawing, cutting through with a plane yz, describing the interior configuration of the engine and specifically focusing on the actions of TDC and BDC valves 121, 122, and 124. The injected hot working fluid 703, that enters the expansion chamber 702 at TDC, is isolated when the inlet port 121 closes and the working fluid 703 expands, forcing downward the working piston 103. The expansion force causes the crankshaft 141 to rotate, which causes the engine output 101 and rotates the belt connection 800 to the cam 802 and gear train to the valve spindle frame 130, creating the appropriate sequential actions occurring in the cycle. As the working piston 103 approaches BDC, port 124 (located at BDC) and port 122 (located at TDC) open to the cooling exchanger 600, simultaneously releasing the contained pressurized cold fluid from the cooling exchanger 600 into the working chamber 104. The released fluid at BDC supercools the working fluid 703 in the working chamber 104 at BDC before recompression. The working fluid 703 and the fluid from the cooling exchanger are mixed together. This mixture is isothermally recompressed back into the cooling exchanger 600 while the remaining working fluid 703 is adiabatically compressed into the fluid pump volume 700. Although the BDC port valve 124 closes at the beginning of the working piston 103 upstroke, valve 122 between the working chamber 104 and cooling exchanger 600 remains open during almost the entire upstroke. At near TDC, valve 122 closes, cam 802 releases the diaphragm 113, allowing it to be forced upwards by the tension spring 709, closing the pump volume, pressing the cycling working fluid 703 back into the high pressure/temperature hot heat exchanger 500 while the inlet valve 121 opens, accessing another high energy bolus into the opening expansion chamber 702. FIG. 7b further describes, with a xy plane sectional cut, the interior workings of the engine 400 and specifically the TDC sequence that insures the effective closing of check valve 125 during the effective closing of pump 700 in sequence with the closing of connection valve 122 and opening of the inlet valve 121. Note that tension spring 709 is biased toward closing the diaphragm 113 at TDC as cam 802 releases, thus closing the fluid pump 700. In order to insure the pump inlet check valve 125 remains closed during the closing of the fluid pump 700, the TDC sequential actions must occur as follows: Connection valve 122 must completely close immediately before the diaphragm 113 is released to close the fluid pump 700 immediately before the inlet valve 121 opens to inject a new bolus of working fluid 703 from the hot heat exchanger 500 (not on drawing). The drawing shows that, as the working piston 103 approaches the near TDC position, the connecting valve 122 to the cooling exchanger 600 closes, the diaphragm 113 passes its drop point 810 allowing the pump 701 to begin closing, and the inlet port 121 opens, all tightly synchronized so as to insure the check valve 125 remains closed during the closing of the pump volume 701, insuring unidirectional flow. Note that all the valves are designed so as to minimize residual dead volumetric pockets, optimizing full utilization or conversion of heat energy to work output during the cycling.

FIG. 8 shows side and front elevations of the engine 400, further describing the configuration of the engine, defining the relationship of the static body 401 parts to the moving parts and specifically focusing on the five valves 121, 122, 124, 125, and 126 and the five volumes 701, 702, 104, 600, and 500 that control the cycle. The drawings give a detailed understanding of the operation of the four valves 121, 122, 124, and 125 that directly interact with the working chamber 104 during the cycle, creating the optimum sequential conditions in that working chamber 104, and look at the exit outlet port 123 that returns the working fluid 703 back to the hot heat exchanger 500. The drawings show the spindle frame 130 that houses the inlet valve 121 that accesses the injected high temperature/pressure bolus into the engine 400. They show the connecting valve 122 between the cooling exchanger 600 and working chamber 104. They show the BDC operation of the uniflow valve 124 between the cooling exchanger 600 and working chamber 104. As the working piston 103 nears BDC, the cam 802 forces the diaphragm 113 downward, opening the pump chamber volume 701. The drawings show the relationship of the cooling exchanger 600 to the working piston 103 as the BDC operation opens the BDC uniflow valve. Note that, as the working piston 103 approaches BDC, BDC ports 124 to the cooling exchanger 600 are uncovered, allowing the cold pressurized fluid in the cooling exchanger 600 to rush out and supercool the working fluid 703 in the working chamber 104 at BDC. Also the drawings shows the unidirectional flow through the pump chamber 701 cavity, specifically showing the operation of the check valve 125 between the working chamber 104 and pump chamber volume 701 and the outlet port 123 where the working fluid exits the engine 400 and enters back into the hot heat exchanger 500.

FIG. 9 shows the engine 400 stripped of its primary outer static body parts 401, showing the interior moving parts such as the working piston 103 and its power train, and the cam/diaphragm 113 and spindle valve 130 train. The power train includes the flywheel 145 and power pully 144. The cam/diaphragm and spindle valve train include the belt 800 connection to the cam rod 801 and the cam 802 train that drives the oscillating movement of the diaphragm 113 and the spindle valve 130. The cam/diaphragm train defines the interchangeable volumes of the fluid pump 700 and the expansion chamber 702. The gear train to the spindle frame 130 and valves 121 and 122 are driven by the rotating cam rod 801. The gear train operates the spindle valve mechanism 130 that houses both the inlet valve 121 from the hot heat exchanger 500 (not in the drawing) to the working chamber 104 (here merging into the expansion chamber 702) and the connecting valve 122 between the cooling exchanger 600 and working chamber 104. The drawing also shows the flapper plate 128 of the exhaust check valve 126 that insures unidirectional flow of the working fluid 703 from the fluid pump volume 700 out of exhaust port 123 to the hot heat exchanger 500.

Figure 10:
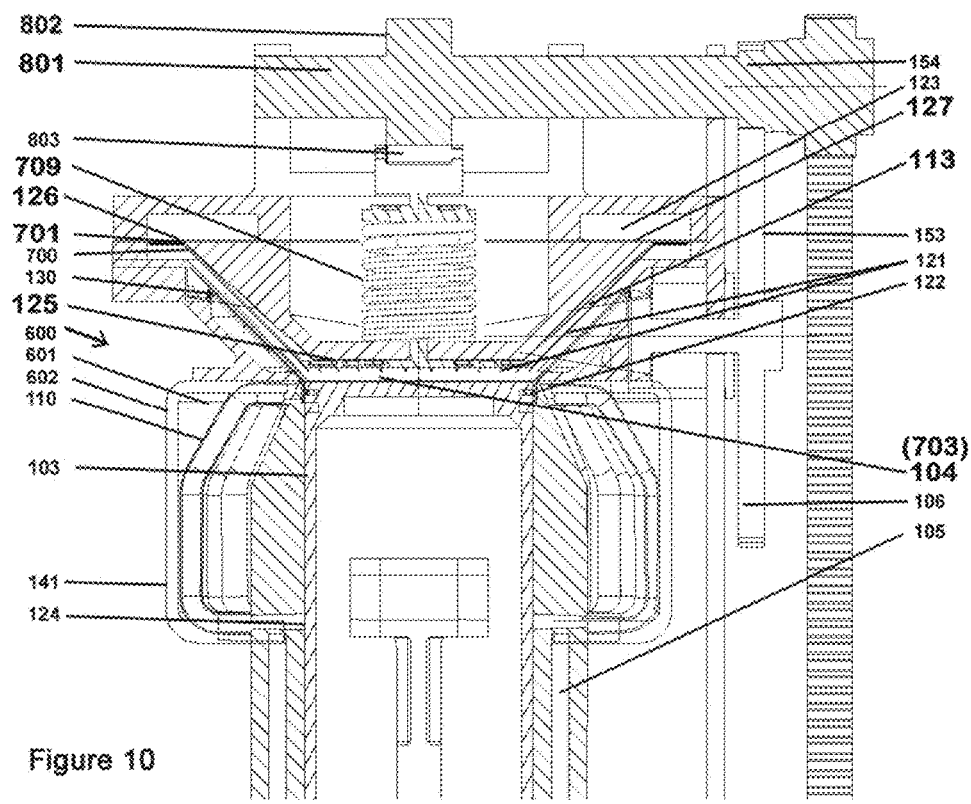
FIG. 10 is a sectional drawing of Soony engine (cutting through using a yz plane) that describes in detail the operation of the oscillating diaphragm. The drawing shows the interior structure of the diaphragm, the spring that forces the diaphragm movement.

FIG. 10 is a sectional cut, using a yz plane, showing a detailed sectional view of the inner works of the engine, focusing specifically on design of the oscillating diaphragm 113 and the components that operate that oscillating diaphragm 113. The drawing shows the cam 802, acting on the connecting cam/diaphragm rod 801 that acts on the diaphragm 113. The diaphragm 113 is designed hollow but strong and light. Providing strength and lightness maximizes the resilience of the mechanism while minimizing the inertia losses of the mechanism during the cycle. Also hollowness minimizes the heat flow through the walls of the diaphragm 113. Note that the cam 802 mechanism is located next to the diaphragm 113, minimizing the weight and hence unnecessary inertia losses during the rapid movement of the diaphragm 113 mechanism. On the inner face of the diaphragm 113, the flapper plate 127 of check valve 125, as seen, allows flow from the working chamber 104 to the pump chamber 701 during the upstroke. As mentioned, the spring 709 forces the movement of the diaphragm 113 and must have sufficient force to overcome the enertia of the diaphragm mechanism 113, the enertia of the working fluid 703 being pumped, the friction of the operation, any resistance through the check valve 126, and any pressure differential that may exist in the balanced pressure environment surrounding the diaphragm 113 operation.

Figure 11:
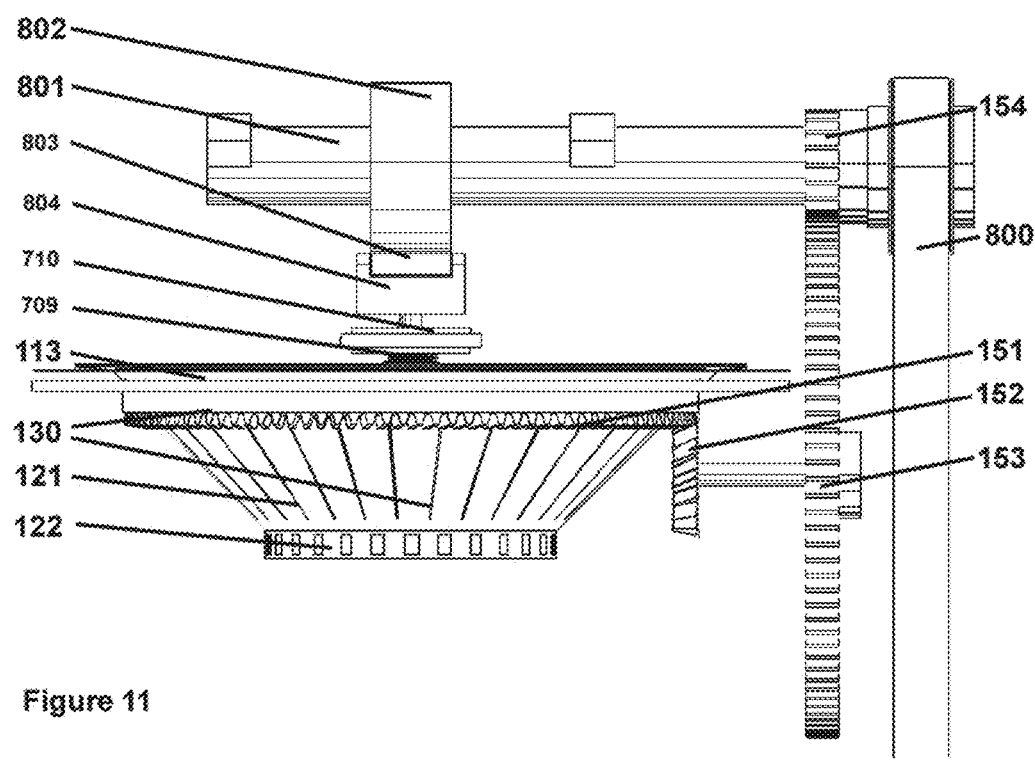
FIG. 11 is a side view of the diaphragm and its valving mechanism, showing in detail the operation of the spindle frame, having a conical frustum shape that houses the inlet valve and the connecting valve between the cooling exchanger and working chamber as they synchronize with the oscillation of the diaphragm.

FIG. 11 is a detail side view drawing showing the operation of the spindle frame 130 that houses the inlet valve 121. As shown, the spindle valve 130 and diaphragm 113 operations are precisely synchronized. Bevel gears 151 and 152 and spur gears connection 153 and 154 drive the rotating inlet valve 121, and the valve connection 122 between the cooling exchanger 600 (not in the drawing) and working chamber 104 (not in the drawing) as they synchronize with the operation of the cam 802 that also drives the oscillation of the diaphragm 113. As explained earlier, the spindle frame 130 rotates one full time per second to open the inlet valve 121 30 times in that second in sync with the 30 rotations per second of the main driveshaft 141 (not in the drawing). It shows the port 122 between the cooling exchanger 600 and working chamber 104 that is open during almost the entire upstroke so as to optimize the flow back and forth, as explained in item 2 in the section called The Valving Interchange in the Working Chamber and the Flow Capacity of the Disclosed Model. Note that the connecting belt 800 between the driveshaft 141 (not in the drawing) and cam rod 801 has a one to one pully ratio.

FIG. 12 also shows specifically the TDC valve operation and inner workings of the inlet valve 121 and connection valve 122. Inlet valve 121 is momentarily open at TDC. The drawing also shows the workings of the valve 122, connecting the cooling exchanger 600 (not in the drawing) to the working chamber 104 (not in the drawing), opened during almost the entire upstroke. As explained above, both inlet valve 121 and connection valve 122 are mounted on the spindle frame 130, having a conical frustum shape as shown in the isometric view drawing and rotating under the gear power train connected to the cam rod 801 which is driven by the driveshaft 141 connected to belt 800. FIG. 12*a* in this drawing shows a detail of port 122 as it rotates on the spindle frame 130, opens at BDC and closes immediately before valve port 121 opens at TDC. Note that the body frame 401 (surrounding and sandwiching the spindle frame 130) provides a seat for spindle 130. When the body frame 402 for the spindle valve are in place and when the diaphragm 113 is in the down position, the diaphragm 113 fits snugly against the sandwiching wall of the spindle frame 130, minimizing the residual dead volumetric pocket losses during the cycle. Note that bevel gear 152 is mounted on the spindle frame 130 which is driven by bevel gear 151. To prevent friction between the contacts of the spindle frame 130 and the engine body frame 401, at the bottom surface of the slit frame, ball bearings 107 are seated to minimize contact between the body 401 and spindle frame 130. The ring portion of the spindle frame 130 rides on these ball bearings 107. FIG. 12*b* shows a top view of the inner workings of the diaphragm 113, the inlet valve 121, and the connection valve 122 between the cooling exchanger 600 and working chamber 104 as explained above.

FIG. 13 shows use of the bellows seal 116 that prevents leakage from the pump chamber volume 701 along the diaphragm rod 115 to the outside atmosphere. Also, the drawing shows the bellows seal 105 along the side of the working piston 103 between the working chamber 104 and crankcase 140, preventing leakage into the crankcase 140. The design of the working piston 103 is elongated so as to insure that the travel of the working piston 103, with its accordion seal 105, is limited so as to minimize wear and tear on the corrugated bellows 105. In this model, the travel of piston 103 is approximately ⅓ the length of the bellows 106. However, if the bellows 105 is eliminated, allowing leakage through the piston rings and along the cylinder wall of the engine 400, a means is provided to return that leaked fluid back into the cycling system. As shown, a connecting tube with a check valve 129 is installed between the crankcase volume 140 and the cooling exchanger 600, providing a means for the unidirectional flow through check valve 129. Thus, a means is provided to return the leaked fluid back into the cycling system (to the cool sink of the cooling exchanger 600) when the working piston 103 is at BDC and when the pressure in the system is at its lowest pressure level in the cooling exchanger 600 during a cycle. Also, shown is the rim bellows 114 of the diaphragm 113, preventing leakage between the expansion chamber 702 and pump chamber 701.

Figure 14A:
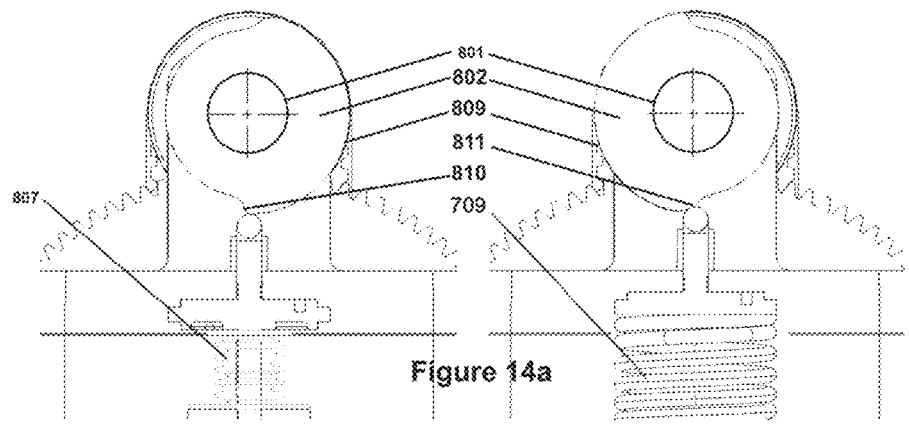
FIGS. 14a and 14b explain the operation of the cam action, creating the oscillation movement of the diaphragm and countered by the biased force of the spring.
Figure 14B:
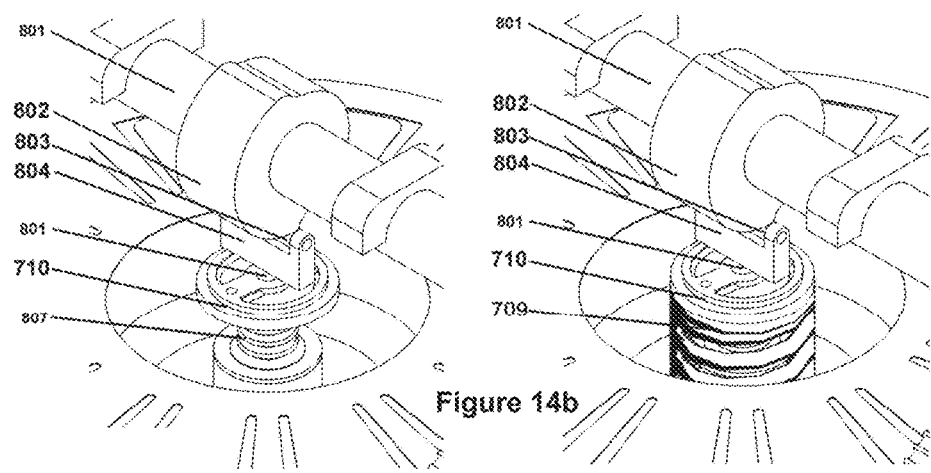

FIG. 14*a* shows a drawing of the cam train that operates the diaphragm 113 (not in the drawing). The cam 802, driven by the cam rod 801, provides a TDC drop 810 on the outer face 809 of the cam 802, allowing the pump chamber 701 to rapidly close. The drop off 810 on the face 809 is designed to rapidly move the diaphragm 113 upwards at TDC to close the pump chamber 701. At approximately 180° around the face 809 surface, the slide 811 on face 809 of the cam 802 provides a means of allowing rapid downward movement of the diaphragm, opening the pump when at BDC. This BDC slide surface 811 on the cam 802 is designed to cock spring 709 and move diaphragm mechanism 113 as it opens the pump chamber 701 volume. FIG. 14*b* shows an isometric drawing of the diaphragm shaft with its spring stop 710, diaphragm rod roller frame 804, roller 803, and cam contact 802. Note that the oscillating movement of the mechanism is minimal, having approximately 6 mm travel, causing minimal wear and tear on the system and on the diaphragm bellows 114 (not in the drawing). The drawing on the right shows the tension spring 709 that forces the diaphragm 113 upward to close the pump chamber volume 701 (not in the drawing) at TDC. The tension spring 709 is free to act on the diaphragm mechanism 113 when the cam 802 releases the diaphragm movement. The cam roller 803 helps avoid lateral friction on the cam surface 809. Note that the cam parameter surface 809 rides on the cam roller 803, dropping abruptly at TDC, allowing rapid closing of the pump chamber 701 (not in the drawing) while providing a smoother transition 811 at BDC, occurring on the parameter surface 809 between the cam 802 and roller 803, recocking the diaphragm position, opening the pump chamber volume 701 (not in the drawing) when the working piston 103 (not in the drawing) is at BDC. The opening action of the pump chamber 701 at BDC must overcome the force of the tension spring 709 and the inertia caused by the rapid movement of the mass of the diaphragm mechanism and its friction.

Figure 15:
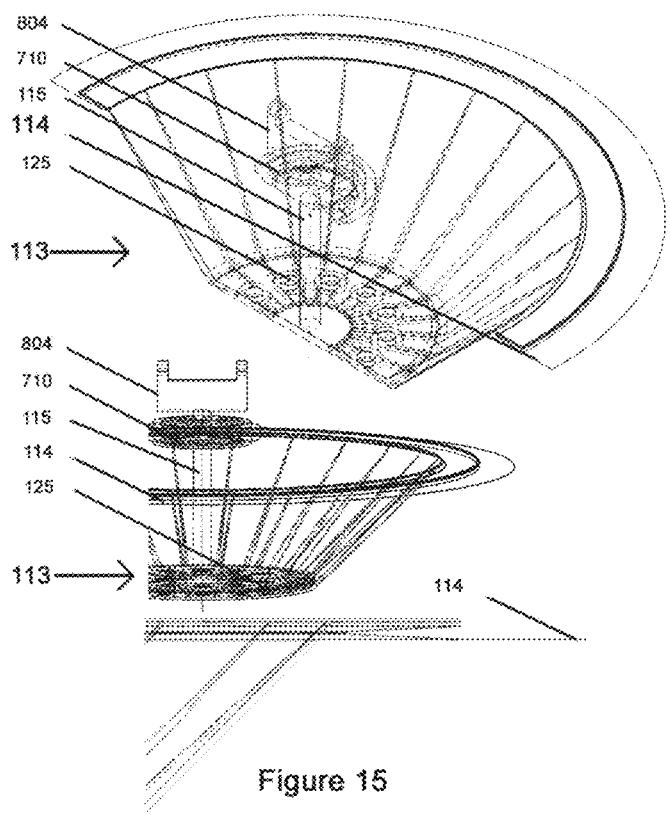
FIG. 15 describes the design of the diaphragm with its bellows seal, hollow structure, diaphragm rod, seating, and roller. The drawings show the diaphragm rim bellows seal and how the walls of the fabricated diaphragm sandwich that bellows.

FIG. 15 shows the bellows seal 114 mounted around the rim of the diaphragm 113. More specifically, it shows the design of the diaphragm 113. The bellows seal 114 is sandwiching between the walls 401 (not in the drawing) that encase the hollow diaphragm 113. Considering the long circumference length of the large diameter of the diaphragm 113 and the minimal distance that the diaphragm 113 travels, the bellows seal 114 eliminates friction, and wear and tear that typically drags on standard pistons. The drawings also show the design of the diaphragm 113, that the diaphragm 113 is hollow and, therefore, light weight. The conical frustum shape optimizes the strength of the diaphragm structure. The diaphragm 113 may be fabricated out of titanium or spring steel. The hollowness also prevents heat transfer since a temperature differential exists between the expansion chamber 702 (not in the drawing) at a high temperature and the pump chamber 701 (not in the drawing). The cup-shaped diaphragm 113 design provides a large available surface area in which the valve openings 121 and 122 of the spindle valve 130 (not in the drawing) can be enlarged even further to maximize the open flow area through the inlet valve 121 while minimizing the residual dead volume in the cycling. The upper flat surface configuration around the rim of the diaphragm 113 provides a convenient location for placing the outlet check valve 126 (not in the drawing) while significantly minimizing the residual dead volumetric waste pockets in check valve 126.

Figure 16:
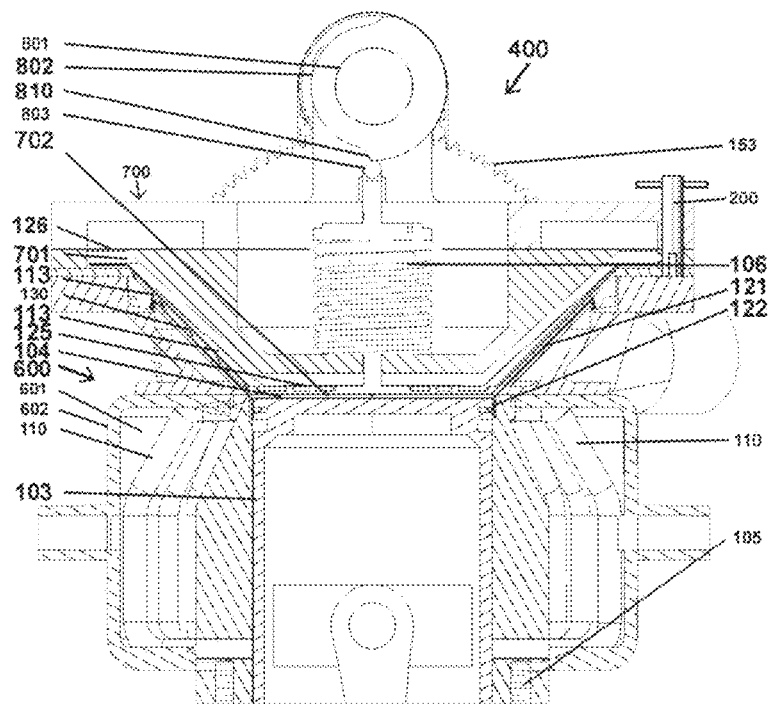
FIG. 16 shows the closing of the compression volume as the working piston approaches TDC, and the transition from a compression upstroke into the pump to a pumping action and TDC injection of the next high pressure/temperature bolus into the expansion chamber. The drawing shows the compact internal configuration of the internal volumes that minimize the dead volumetric pockets in the cycle.

FIG. 16 is a sectional cut of the engine, using a xy axis plane, showing the working piston 103 approaching TDC while the diaphragm 113 is still in the down position with the pump open. Note that, as the connection valve 122 between the cooling exchanger 600 and working chamber 104 closes, the volume 104 between the piston 103 and diaphragm 113 will tend to compress. This tendency to constrict the volume is countered because the diaphragm 113 begins to move up, opening the expansion volume 702, preventing jam due to hyper compression. Note that, as seen in the drawing, the cam 802 is seen right on the edge of the cam drop 810, seen right before the diaphragm 113 is freed by the cam 802 to move upward and to close the pump chamber 701 due to the force of the spring 106. When the pump chamber 701 begins to close, the working fluid 703 (not in the drawing) in the working chamber 104 will shift from being pushed through check valve 125 into the pump chamber volume 701 to pressing into the enlarging expansion chamber volume 702. As the pump chamber 701 closes, the working fluid 703 (not shown in the drawing) will be pushed out of the engine 400 through check valve 126 and into the hot heat exchanger 500 (not in the drawing). Note that the closed cooling exchanger 600 will contain its high pressure, cooled fluid until reaching BDC for the next BDC release into the working chamber 104, supercooling of the expanded working fluid 703.

Additionally, FIG. 16 shows the compact internal configuration of the internal volumes affecting the cycling process of the engine 400. The interior volumes, that contain the working fluid 703 flowing through the cycling system, are compactly configured wherever possible so as to eliminate losses or wasted energy due to residual volumetric pockets of uncycled working fluid. The relevant volumes are designed compacted so as to minimize any dead volumetric pockets that are not being cycled through the engine 400 during the disclosed action. These dead volumes are minimized in order to optimize the thermal to work conversion of the system. Also, when the working piston 103 is at its TDC position, diaphragm 113 is in its down position (with pump volume 701 open), thus again minimizing the residual dead volumetric pockets. Internal volumes (that comprise the internal volumes that contain the working fluid being cycled) include: the expansion chamber 702, the working chamber 104, the cooling exchanger 600, and the pump chamber 701; and are relevant to achieving the optimum heat to work conversion. All other volumes outside of these four listed volumes are not part of nor are have relevant to the above listed internal volumes that affect the engine efficiency. Since minimizing the residual dead volumetric pockets will significantly improve the cycle efficiency of the engine, the means for achieving this improvement must also be herein included as proprietary disclosures. Note the bridge valve 200 that provides a means of balancing the pressure surrounding the diaphragm during the engine startup is shown in this drawing.

FIG. 17 describes the design of the containment furnace 900 that contains the heat that drives the engine 400. The heat is primed and fed into the containment furnace 900 using a typical gas facet nozzle 903 which typically fires conventional home furnaces. The outer wall 902 of the furnace 900 is made of a light weight silicone material that is used in mold making for metal casting. Note that the hot gas in the hot heat exchanger 500 (not in the drawing) used by the engine is the same volume of the furnace inner exchanger coils 901. The hot gas exits the furnace at the top port 904 near the gas facet nozzle 904, and enters at the bottom port 905 from the engine 400 (not in the drawing). The cooler flue gas exits the containment furnace at flue outlet 906. In other words, the burned gas fumes will exit from the lower back outlet 906 of the furnace 900 and flow through conventional flues to the exchangers in the other furnace room appliances, such as the water heater and HVAC before, finally venting to the atmosphere, optimizing the heat utilization. Note that the Gas-Tricity Furnace 900 contains the heat used by the engine 400, but uses the heat that is exhausted through the flue outlet 906 to boost heating of the water heater and the home central HVAC. FIG. 20 shows a diagram of the overall furnace room system.

Figure 18:
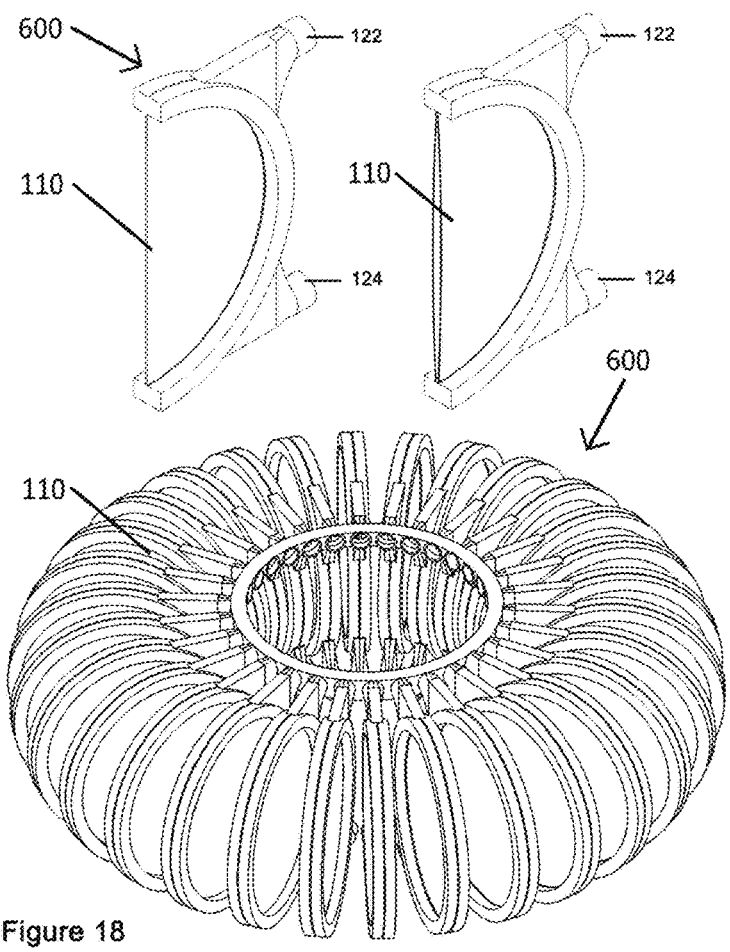
FIG. 18 describes the flexible volumetric capability of the cooling exchanger that will allow for an excess of pressed fluid into the cooling exchanger so as to give time during the downstroke for that compressed fluid to fully cool before its BDC release.

FIG. 18 discloses a means of increasing the volume in the cooling exchanger 600 with the pressurization occurring during the upstroke, describing the design of the cooling exchanger 600 in the engine 400 (not in the drawings). The fluid that is pressed into the cooling exchanger 600, due to the speed of the engine, may not be immediately cooled. However, that fluid is contained in the cooling exchanger 600 during the entire downstroke of the cycle, allowing additional time for fully cooling that compressed fluid before it is released at BDC to supercool the expanded working fluid 703 (not in the drawings) in the working chamber 104 (not in the drawings). As the warmer compressed fluid in the cooling exchanger 600 cools, its volume will shrink. The fins 110 (formally tubes) of the cooling exchanger 600 have flexible walls, providing a means of expanding the inner volume so as to capture the necessary volume at TDC but also allowing time for the heat in that captured inner volume to cool during the engine downstroke from TDC to BDC before its pressurized fluid is released into the working chamber 104 so as to supercool the working fluid 703 at BDC before the recompressing upstroke from Points 3 to 4 (Stage 3).

Figure 19:
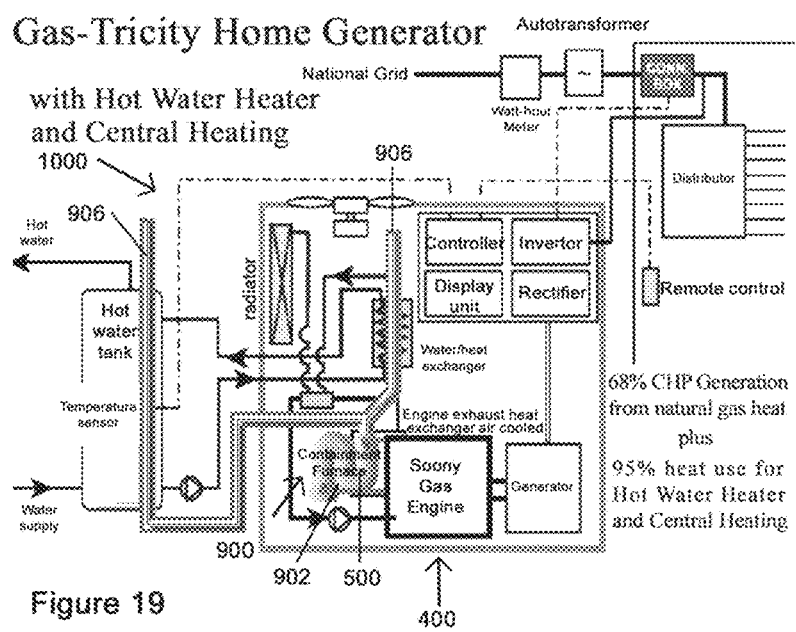
FIG. 19 shows the furnace room Gas-Tricity appliance as related to the other furnace room appliances such as the water heater and HVAC, and how a sizable amount of electricity is generated by the GTHG package so as to provide "net metering" and, hence, owner income.

FIG. 19 shows the furnace room layout or relationship of the Soony engine 400 and Gas-Tricity home generator 1000 to the other furnace room appliances. Note that the flue outlet 906 of the containment furnace 900 passes through the water heater and through the HVAC. Although the Soony engine 400 and the Gas-Tricity Home Generator (GTHG) 1000 embody the core application of this disclosure, the specific disclosure applies to and encompasses integration with all the appliances in a furnace room package. Note that a sizable portion of the electricity that will be generated by the GTHG will feed into the national grid through "net metering," reversing the meter, serving as an electricity supplier for the national grid, while providing home owners payback income.

FIG. 20 shows the Soony engine 400 configured with four working chambers. Although the cycle herein shown is for a one-cylinder engine, the Soony concept is not limited to one-cylinder. The Soony concept also applies to multi-cylinder engines, to any number of cylinder configurations as often occur with other engines (such as combustion engines for cars, trucks and large generators). The sequence of strokes of multi-cylinder engines which is commonly practiced with all multi-cylinder engines, is simply determined by the angular placement of their journals on the main driveshaft. Multi-cylinder engines are configured so that the position the piston strokes are staggered sequentially, as are typical with four, six, and even an eighteen cylinder engines that drive large heat generators. The cam rod 801 will share a common axis that may be connected by multi gears (commonly driven by the main driveshaft 141), eliminating the need for a connecting belt 800 between the driveshaft 141 and cam rod 801. The valve design and the design of the cooling exchanger (as shown in these drawings) are compacted in the embodiment as herein disclosed so as to minimize the residue dead volumes in the cycle.

The following figures are earlier versions included in the submitted provisional:

FIG. 21 shows use of a magnetic coupling seal 300 that prevents leakage along the shaft opening between the bevel gear 150 and the interior volume of the spindle valve 130. A magnetic coupling 142 can also be used to seal the main driveshaft 141 of the engine, preventing leakage from the crankcase to the outside atmosphere. In this application, the drawing shows both a seal 300 for a spool valve 130 that was used for an earlier design of the Soony engine 400 and the design of a typical magnetic coupling means that can seal other rotating components from the inside to the outside atmosphere of the engine, such as is shown in FIG. 23, the use of a magnetic coupling seal 300 can seal the driving axis 152 of the spindle valve mechanism 130.

Figure 22:
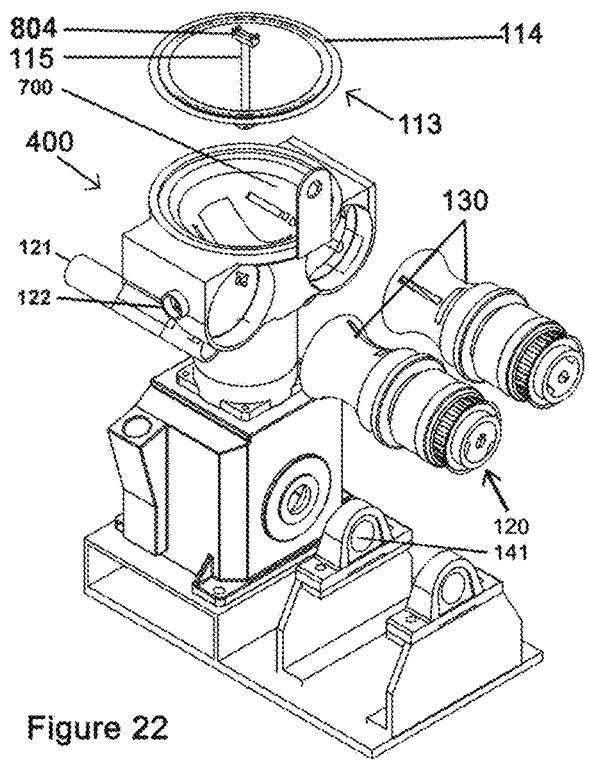
FIG. 22 shows an earlier design model that uses a spool valve as a means for metering the hot bolus through its inlet valve from the hot heat exchanger to the expansion chamber and for metering flow between the cooling exchanger and working chamber during heat removal and BDC cooling. The design also includes the earlier design of the diaphragm as herein disclosed.

FIG. 22 shows the design of the diaphragm 113 with its rim bellows seal 114, its rod 115, and rod roller frame 804, and its relationship to the body frame 401 of the engine 400. The drawing also shows the relationship of the spool valves 130 to the engine body 401. The spool valve 130 design is herein replaced with the latest version of the spindle valve 130 which significantly reduces the residual dead volumetric pocket losses in the valving and mechanism system. However, the spool valve disclosure is included herein because its design may also prove a useful alternative.

Figure 23:
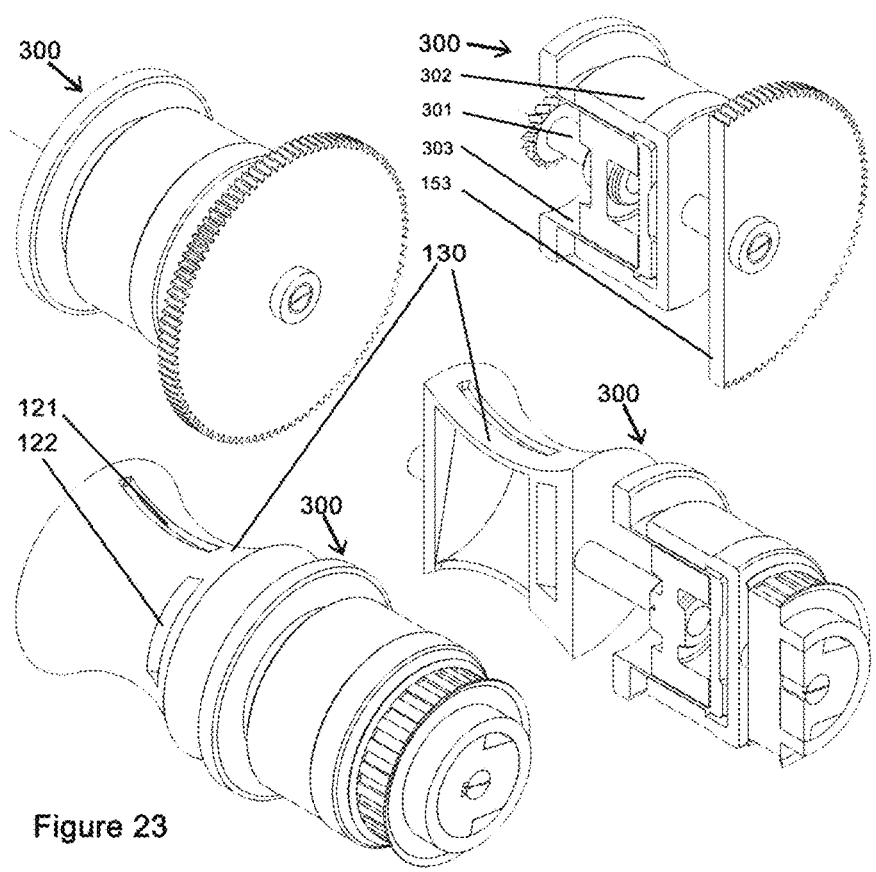
FIG. 23 shows an earlier spool valve disclosure with its magnetic coupling and means of sealing, using a magnetic coupling, leakage along the bevel gear shaft of the spindle valve train.

FIG. 23 shows, in the lower drawing, an earlier design for the spool valve 130 with the inlet valve port 121 and the port 122 between the cooling exchanger 600 (not in the drawing) and working chamber 104 (not in the drawing). This spool valve design is now replaced by the spindle valve 130 as shown in the upper drawing. Note that the spool valve 130 is design like a Chinese top with a concave wall that raps around the outer surface of the conical frustum shaped diaphragm 113 (not in the drawing) so as to prevent residual dead volume pockets between the spool valve 130 and diaphragm 113. This image also shows use of the magnetic coupling seal 300 as also is described in drawings in FIG. 21.

TERMS

1000—the thermal system, called the Gas-Tricity, including the Soony engine and containment furnace
400—engine
401—engine body frame
402—body frame for the spindle valve frame, having conical frustum shape
500—a heat exchanger
600—a cooling exchanger
601—cooling water
602—cooling exchanger casing
700—a fluid pump
701—pump chamber
702—expansion chamber
703—working fluid
110—tubes of a cooling chamber
101—output mechanism
121—inlet port
122—port to and from the cooling exchanger
123—engine outlet port
124—BDC port to cooling exchanger
125—check valve between the working chamber and pump chamber
126—check valve between the pump chamber and the heat exchanger
127—flapper plate of valve 125
128—flapper plate of valve 126
129—check valve between the crankcase volume 140 and the cooling exchanger volume 600
103—power piston
104—the working chamber
105—power piston bellows
106—connecting rod
107—ball bearings for seat of spindle frame for valves 121 and 122, having a conical frustum shape
113—diaphragm
114—diaphragm rim bellows
115—diaphragm rod
116—diaphragm rod bellows
709—tension spring
710—spring stop
100—upstroke compression chamber in the working chamber
800—belt between the crank shaft and cam rod
801—cam rod
802—cam
803—cam rod roller
804—diaphragm rod roller frame
805—diaphragm rod roller frame seat
806—cam rod belt pully
807—cam rod bellows
809—outer face
810—TDC cam outer face drop
811—BDC cam outer face slide
140—crankcase volume
141—crankshaft
142—crankshaft magnetic coupling
143—crankshaft belt pully
144—main crankshaft pully
145—main crankshaft flywheel
130—spindle frame, having a conical frustum shape
133—spindle frame for the inlet valve ports, having a conical frustum shape
134—spindle frame for the cooling exchanger valve ports, having a conical frustum shape
150—bevel and spur gears
151—bevel gear for the spindle frame
152—small bevel gear and shaft
153—large spur gear
154—small spur gear on the cam rod
900—containment furnace
901—furnace inner exchanger coils
902—furnace outer casing
903—gas facet
904—furnace hot outlet
905—furnace cooler inlet
906—flue outlet
300—magnetic coupling
301—interior shaft of magnetic coupling
302—exterior shaft of magnetic coupling
303—membrane of magnetic coupling 200—bridge valve between the expansion chamber and pump volume 201—shutoff valve between the heat exchanger and the engine

The invention claimed is:

1. An adiabatic cycle heat engine, comprising:
a working chamber;
a power piston housed within the working chamber and configured to
   run on working fluid in a high pressure state receivable from a heat exchanger, and
   move between Top Dead Center (TDC) and Bottom Dead Center (BDC) of the working chamber to complete an engine cycle;
a pump including a pump chamber;
a conical frustum spindle shaped frame including
   a conical frustum shaped inlet valve configured to batch and isolate said working fluid in said working chamber for near adiabatic expansion;
a cooling exchanger configured to release cooled fluid to cool said working fluid in said working chamber after a near complete expansion movement of said power piston;
a TDC connecting valve mounted on said spindle shaped frame and between said cooling exchanger and said working chamber, and configured to separate a portion of said working fluid from said working chamber and isothermally cool said working fluid in response to the power piston compressing the portion of said working fluid at a constant low temperature into said cooling exchanger;
a BDC uniflow valve at the BDC of said working chamber and configured to
   close to contain said compressed cooled fluid in said cooling exchanger, and
   open to release said compressed cooled fluid into the working chamber in response to said power piston near completion of a sequential expansion stroke of said power piston;
a unidirectional check valve between said working chamber and said pump chamber; and
an outlet valve between said pump chamber and said heat exchanger,
wherein the cooling exchanger is configured to remove heat energy from said working fluid sequentially expanded in the working chamber by releasing said cooled fluid in said cooling exchanger into said working chamber,
during a compression of said cooled fluid in said working chamber, the power piston is configured to move from the BDC to the TDC of the working chamber to separate said working fluid to isothermal and adiabatic portions according to a ratio differential of respective densities, the isothermal portion of said working fluid pressed isothermally into the cooling exchanger removing the heat while the adiabatic portion of said working fluid, not pressed into the cooling exchanger, is pressed adiabatically into the pump chamber of said pump,
in response to that the isothermal and adiabatic portions of the working fluid in the working chamber are compressed, a quantity of working fluid compressed into the pump is equal to a quantity of the working fluid initially injected into the engine with the power piston at the TDC from the heat exchanger beginning the engine cycle,
wherein the engine is configured to perform the engine cycle including a near adiabatic cycle by performing the near adiabatic expansion of said working fluid in the engine by causing
   the inlet valve to close off after a flow of said working fluid that is batched into said engine passes therethrough,
   the power piston to move from the TDC to the BDC to sequentially expand said working fluid in the working chamber while said cooled fluid in the cooling exchanger is held in compression from a previous upstroke and in containment,
   said cooling exchanger to release said contained cooled fluid, through the TDC connecting valve and the BDC uniflow valve, to the working chamber to cool said expanded working chamber in response to the power piston at the BDC,
   said TDC connecting valve to open for passing therethrough said contained cooled fluid from said cooling exchanger while adiabatically expanded working fluid is cooled, and
   said BDC uniflow valve, exposed by said power piston in said working chamber at the BDC, to open for passing therethrough said contained cooled fluid from said cooling exchanger,
in the heat absorption of said working fluid in said cooling exchange during said compression, said TDC connecting valve is configured
   to remain open during nearly an entirety of compression stroke of the power piston to adiabatically press out nearly all said working fluid in said working chamber, not pressed into the cooling exchanger, into said pump chamber through the unidirectional check valve between said working chamber and said pump chamber,
   to complete the engine cycle with the power piston at near the TDC, with the unidirectional check valve between said working chamber and said pump chamber closed, causing a unidirectional flow through said pump to the heat exchanger, and
   to complete the engine cycle with the power piston at near the TDC, with the outlet valve between said pump chamber and said heat exchanger opened, causing the unidirectional flow from said pump chamber to the heat exchanger to minimize residual dead volumetric pockets of uncycled said working fluid in the working chamber and the pump chamber during the heat to work conversion of said engine cycle.

2. An adiabatic cycle heat engine, comprising:
a piston chamber;
a pump chamber;
a power piston configured to move within the piston chamber and run working fluid in a high pressure state receivable from a heating exchanger; and
a cooling exchanger configured to contain said working fluid in said cooling exchanger to gain additional time for heat removal before releasing said working fluid, and control a quantity and a density of said working fluid in said pump chamber,
wherein the quantity of said working fluid in said pump chamber is balanced to be equal to a quantity of said working fluid that was initially injected into said piston chamber by balancing a density ratio of said working fluid between said pump chamber and said cooling exchanger so as to maximize isothermal heat absorption in said cooling exchanger and adiabatic compression in said pump chamber.

3. The heat engine of claim 1, wherein
a residual dead volumetric pocket in said conical frustum shaped inlet valve from said heat exchanger to said engine is minimized,
a residual dead volumetric pocket in said unidirectional check valve between said working chamber and said pump chamber is minimized,
a residual dead volumetric pocket in said BDC uniflow valve between said cooling exchanger and said working chamber is minimized,
a residual dead volumetric pocket in said TDC connecting valve between the cooling exchanger and said working chamber is minimized,
a residual dead volumetric pocket in the outlet valve between the pump chamber and the heat exchanger is minimized, and
a residual dead volumetric pocket in the conical frustum spindle shaped frame is minimized.

4. The heat engine of claim 1, further comprising including
an oscillation diaphragm, configured to define alternately the pump chamber and an expansion chamber of the pump, and having a conical frustum shape so as
to optimize structural integrity and strength of walls of the oscillating diaphragm,
to add strength while decreasing a weight of the diaphragm, and
to decrease a residual dead volume of said working fluid being cycled, minimizing volumetric pocket waste at the unidirectional check valve between said working chamber and said pump chamber,
wherein said unidirectional check valve mounted on said conical diaphragm between said working chamber and said pump chamber is configured to
cause said working fluid to directly compress out from said working chamber to said pump chamber, and
close automatically in response to the power piston being at near the TDC due to pressurization occurring inside said pump chamber that is caused by the closing of said pump chamber,
said diaphragm in response to closing of said pump chamber is configured to move to cause a higher pressure condition inside said pump chamber than the working chamber, and to maintain closing of said unidirectional check valve between the working chamber and the pump chamber during the closing of said pump chamber,
the outlet valve between said pump chamber and said heat exchanger includes a flapper plate component sandwiched between conical frustum shaped body encasement walls that enclose said pump chamber causing the unidirectional flow from the pump chamber to said heat exchanger,
the inlet valve between said working chamber and said pump chamber has multi-inlet openings, and
the outlet valve between said pump chamber and said heat exchanger has multi-outlets around an upper parameter of one of said conical frustum shaped body casement wall that encloses said pump chamber.

5. The heat engine of claim 1, wherein
a separation between high and low pressures in the engine is maintained by sequential operations of the outlet, inlet, unidirectional check, TDC connecting, and BDC valves in the working chamber and the pump chamber,
the unidirectional flow is caused by the sequential operations of closing of the unidirectional check valve between said working chamber and said pump chamber and opening of said outlet valve between said pump chamber and said heat exchanger,
the sequential operations occur in response to said power piston approaching and leaving the TDC to close the TDC connecting valve between said cooling exchanger and said working chamber before causing a diaphragm separating said pump chamber and an expansion chamber to move toward closing of the pump chamber, and
said expansion chamber on a bottom side of said diaphragm, as defined by a displacement movement of said diaphragm, is configured to open before said inlet valve to said expansion chamber is opened, to cause the working fluid to enter the engine from said heat exchanger,
said working chamber is configured to substantially empty the working fluid into said pump chamber and said cooling exchanger before said TDC connecting valve between said cooling exchanger and said working chamber closes,
when said TDC connecting valve between said cooling exchanger and said working chamber closes, a diaphragm mechanism is configured to release causing the diaphragm to move to close said pump chamber,
a force acting on said diaphragm maintains a pressure on a face of said unidirectional check valve between said working chamber and said pump chamber to cause said unidirectional flow through said pump to said heat exchanger,
after said diaphragm begins to move, said inlet valve from said heat exchanger is configured to open to said expansion chamber, allowing an opening void in said expansion chamber to fill, and
when said power piston approaches the TDC, a diminishing volume of said working fluid in said working chamber during the compression shifts from compressing into said pump chamber to merging into the void being defined as said expansion chamber.

6. The heat engine of claim 1,
wherein the inlet valve on the spindle shaped frame is configured to open in response to the power piston being at the TDC, allowing said working fluid from said heat exchanger into said engine,
said spindle shaped frame and means for operating a diaphragm are directly connected and synchronize to achieve predetermined timing and flow/action sequence,
a spindle shaped frame movement is minimized while openings of said inlet valve are maximized, causing maximum fluid flow into the engine,
at a base of said spindle shaped frame is attached a ring frame where said TDC connecting valve between said cooling exchanger and said working chamber is mounted,
said inlet valve between said heat exchanger and said expansion chamber on said spindle shaped frame has multi-openings, minimizing the spindle shaped frame movement while optimizing the fluid flow,
said TDC connecting valve between the cooling exchanger and working chamber has multiopenings and is configured to open during nearly the entirety of the compression stroke of the power piston,
the TDC connecting valve between said cooling exchanger and said working chamber is configured to close before a movement of said diaphragm is released before said inlet valve opens, a friction between said conical frustum spindle shaped frame and a casing of an engine body is minimized by placing ball bearings between said engine body and said spindle shaped frame, and the ball bearings are placed on two planar surfaces of the conical frustum spindle shaped frame.

7. The heat engine of claim 1, further comprising:

a cam configured to actuate a diaphragm and located adjacent to a diaphragm mechanism so as to minimize a weight of said diaphragm mechanism, and to minimize mechanical losses due to inertia wherein the conical frustum shaped diaphragm is hollow and reinforced with internal ribs, supporting inner and outer walls of the diaphragm for minimizing a weight of the diaphragm while maximizing a strength of the diaphragm, and the diaphragm is fabricated of materials including at least one of titanium or spring steel.

8. The heat engine of claim 1, wherein said cooling exchanger has a volume therein having a size to accommodate a predetermined isothermal absorption during the compression so as to accommodate a predetermined adiabatic compression of said working fluid into said pump chamber that near matches a predetermined ideal adiabatic compression, the volume of said cooling exchanger is sized to achieve near adiabatic compression during said compression into said pump chamber to cause the quantity of said working fluid being pressed into said pump to be equal to the quantity of working fluid initially injected at the TDC into an expansion chamber from said heat exchanger, the quantity of working fluid in said pump is equal to the quantity of working fluid in said expansion chamber by balancing a density ratio of the working fluid between said cooling exchanger and said pump chamber so to achieve the heat absorption in said cooling exchanger and by sizing the volume inside said cooling exchanger, a predetermined quantity of adiabatic compressed working fluid is pressed into said pump that is equal to the quantity of said working fluid injected at the beginning of the engine cycle, said cooling exchanger is located around an outside parameter of said working chamber so as to integrate and provide a fluid access and the flow between said cooling exchanger and said working chamber, and the flow of said released cooled fluid from said cooling exchanger to said working chamber is optimized by the synchronize opening of said BDC uniflow valve, exposed due to said power piston at the BDC, and the simultaneous opening of said TDC connecting valve between said cooling exchanger and said working chamber.

9. The heat engine of claim 1, further comprising:

a parameter bellows seal configured to seal a leakage of said working fluid around a rim of a diaphragm separating said expansion chamber and said pump chamber;

a first bellows seal configured to seal a leakage along a diaphragm rod between the pump chamber interior volume and an outside atmosphere;

a second bellows seal configured to prevent a leakage of the working fluid between said power piston and a crankcase and to elongate relative to the movement of said power piston for minimizing wear and tear of said second bellows seal between said power piston and said crankcase; and means for handling said wear and tear of an oscillating movement of said second bellows seal while eliminating a friction with a resilient material including spring steel; and means for returning the leaked working fluid back into cycling volumes of the engine and recycling, when a pressure in said cooling exchanger is at a lowest pressure/temperature point in the cycle, wherein said means for returning the leaked working fluid, when said working fluid seeping into said crankcase, flows back the leaked working fluid from said crankcase to said cooling exchanger due to a pressure differential between said crankcase and said cooling exchanger, returning said leaked working fluid to the cycling volumes through another unidirectional check valve placed between said crankcase and said cooling exchanger.

10. The heat engine of claim 1, further comprising:

a first magnetic coupling configured to seal a shaft between an interior bevel gear connection mounted on the spindle shaped frame and outside atmosphere, for preventing leakage;

a second magnetic coupling configured to connect a torque of a bevel gear mechanism that actuates the spindle shaped frame valve inside the engine to a spur gear in the outside atmosphere; and a third magnetic coupling configured to
seal a main drive shaft from leakage to the outside atmosphere while transferring engine power and
provide a torque connection from an interior power output of the engine to an exterior power output.

11. The heat engine of claim 1, further comprising:

a ceramic casing or wall configured to provide heat containment in said working chamber so as to minimize the heat absorption through the ceramic wall during operation; and a ceramic material containing the heat in said working chamber, a diaphragm encasement body, and a pump encasement so as to minimize heat transfer through the ceramic wall.

12. The heat engine of claim 1, further comprising:

a shutoff valve configured to prevent a flow of working fluid from said heat exchanger to said engine, for preventing an equalization of pressures in said engine when idle and preventing flooding of said engine; and an open channel bridge valve configured to connect an expansion chamber and said pump chamber in response to a stop of said engine, causing an artificial balance of pressure in an environment surrounding an oscillating diaphragm between said expansion chamber and said pump chamber during an engine startup, wherein said bridge valve is configured to gradually close as said engine establishes predetermined pressure/temperature separation and balance the pressure environment surrounding the oscillating said diaphragm to cause said engine to run independently, and said inlet valve between said expansion chamber and said pump chamber is configured to serve as said bridge valve for said startup of said engine.

13. The heat engine of claim 1, wherein during an engine startup, said power piston, acting in said working chamber, is configured to be driven driving by an alternator motor, converting said engine into a circulation pump that drives leaked working fluid in said engine back out into said heat exchanger before transitioning from a startup pumping mode to a running mode, and the engine with a flywheel is configured to be started with the alternator motor to build up rotational momentum.

14. The heat engine of claim 1, further comprising:

solenoid actuating mechanisms with sensors configured to actuate a main shut off valve between said heat exchanger and said engine or a bridge valve between said working chamber and said pump chamber.

15. The heat engine of claim 1, further comprising:

means for interconnecting actions of a driveshaft and a cam rod;

a series of gears configured to transfer and interconnect action between the driveshaft and the cam rod; and a timing belt or belts configured to connect a main driveshaft with the cam rod, a cam, and a spindle valve mechanism.

16. A system comprising:

the heat engine of claim 1, and a containment furnace configured to produce and contain a furnace heat to drive the engine, wherein the furnace heat is produced by burning fuel through a facet fuel burner, an outer shell of the containment furnace is made of a heat containing material including ceramic shell, inside the furnace, the heat produced from the facet fuel burner is transferred to the working fluid through said heat exchanger that stretches a length of the furnace, the furnace is linear, worm, or spiral shaped to contain internal heat or optimize the transfer of the internal heat from the heat exchanger to the engine, and to conform to an interior space and requirements of an appliance encasement, the furnace is configured to exhaust fumes through an exit flue before passing the heat through the water heater and/or HVAC unit for preheating, temperature sensors are configured to maintain a predetermined flowrate through said furnace by monitoring an operation of said containment furnace and associated appliances for predetermined temperature and heat utilization and/or heat to work conversion between all the appliances, an internal fan is configured to contain and draw off the heat from the furnace to maintain the predetermined flowrate, said containment furnace, said engine and generator are configured to interphase with a central heater, water heater, AC, and absorption chiller to achieve predetermined heat utilization, and the temperature sensors are attached to the facet fuel burner of the containment furnace to regulate the optimum temperature/heat utilization.

17. The heat engine of claim 1, wherein the power piston is configured to oscillate as a floating piston, with a linear electricity generator means that oscillates as a floating piston, and an oscillating action of the power piston acts on an oscillating diaphragm through a dampering mechanical connection including a lever, solenoid, or linear or circular gear, or acts directly on the oscillating diaphragm.

18. The heat engine of claim 1, further comprising:

a plurality of power pistons and a plurality of working cylinders configured to accommodate various applications.

19. The heat engine of claim 1, wherein the working fluid for the engine includes helium, hydrogen, carbon dioxide, or air.

20. The heat engine of claim 2, wherein the cooling exchanger comprises a fin configured to momentarily increase a volume inside said cooling exchanger during said compression of said working fluid so as to gain additional time for heat removal during said containment of said working fluid in said cooling exchanger before releasing said working fluid into the piston chamber.

\* \* \* \* \*